(12) United States Patent
Kawaguchi et al.

(10) Patent No.: US 6,226,833 B1
(45) Date of Patent: May 8, 2001

(54) MOVABLE BLOWER

(75) Inventors: Kiyohisa Kawaguchi; Mamoru Iwamoto, both of Mishima (JP)

(73) Assignee: New Delta Industrial Co., Ltd., Shizuoka (JP)

( * ) Notice: Subject to any disclaimer, the term of this patent is extended or adjusted under 35 U.S.C. 154(b) by 0 days.

(21) Appl. No.: 09/340,581

(22) Filed: Jun. 28, 1999

(30) Foreign Application Priority Data

Jun. 30, 1998 (JP) .................................................. 10-184427
Mar. 1, 1999 (JP) .................................................. 11-052137

(51) Int. Cl.$^7$ ........................................................ A47L 5/14
(52) U.S. Cl. ................................................ 15/405; 15/330
(58) Field of Search .......................... 15/328, 330, 405; 16/110.1; 241/55, 56, 101.78

(56) References Cited

U.S. PATENT DOCUMENTS

| | | | |
|---|---|---|---|
| 2,180,269 | * 11/1939 | Wisher | 15/405 |
| 3,817,547 | * 6/1974 | Erickson | 16/110.1 |
| 3,959,846 | * 6/1976 | Yasuda | 15/405 |
| 4,118,826 | * 10/1978 | Kaeser | 15/405 |
| 5,090,088 | * 2/1992 | Toth | 15/405 |
| 5,107,566 | * 4/1992 | Schmid | 15/405 |
| 5,294,063 | * 3/1994 | Bote | 15/405 |

FOREIGN PATENT DOCUMENTS

2256875 * 5/1973 (DE) ........................................ 15/405

* cited by examiner

Primary Examiner—Terrence R. Till
(74) Attorney, Agent, or Firm—Jordan and Hamburg LLP

(57) ABSTRACT

A blower to which power is connected from an electric motor is swingably mounted on a wheeled support. A handle is attached to the wheeled support so as to be vertically adjusted. It is also possible to pivotally support the blower on the moving means in a lower position, construct a vertical swing linking mechanism in a position higher than the above position, attach a lever for adjusting the position in the vertical direction of the discharge pipe, and connect a cable to the vertical swing linking mechanism. A lever for swinging the discharge pipe may be attached to the handle and a cable can be directly interposed between the lever and the discharge pipe. An endless first cable is wound around the discharge pipe, a part of the first cable is fixed to the discharge pipe, a second cable is interposed between an actuating member for moving the first cable in one direction and the lever provided for the handle, the actuating member is retained by the first cable at the lever operating time, and the first cable is consequently moved. Further, an urging member is connected to the first cable. When an operation force to the lever is cancelled, the first cable becomes free from the actuating member, the first cable is returned by the urging force of the urging member, and the discharge pipe is returned to the original position.

17 Claims, 21 Drawing Sheets

MOVABLE BLOWER

BACKGROUND OF THE INVENTION

1. Field of the Invention

The present invention relates to a movable blower for cleaning a garden, a plant site, or the like by blowing away fallen leaves, refuse, and the like to collect them in a place where they can be easily cleaned.

2. Prior Art

For the purpose of, for example, collecting fallen leaves, refuse, and the like in a garden or the like to a place where they can be easily cleaned, a blower is conventionally used. Specifically, a cleaning work or the like is performed in such a manner that a pressed air generated by the rotation of a blower fan by a driving force of a driving motor is discharged as a high-speed air flow via a nozzle of a blower to the ground or the like to blow away and collect fallen leaves, refuse, and the like. Such a blower for cleaning is conventionally of a backpack type. When a high power is used, the weight is accordingly heavy and it is laborious. When the blower is mounted on moving means such as a carriage, a heavy blower which can generate a high power can be easily moved. In the case of changing the air discharging direction of a nozzle, however, it is necessary to change the nozzle position by moving the blower with the moving means in the lateral and vertical directions and it is more laborious. Since an internal combustion engine such as a two-cycle gasoline engine is used for the driving motor, it is very noisy at the time of the work. It makes not only the worker but also the neighborhood feel unpleasant. Since an exhaust is emitted, it is unavoidable for the worker to perform the work in such adverse environment.

SUMMARY OF THE INVENTION

It is a first object of the invention to provide a movable blower which is made less laborious by eliminating the need to carry a heavy blower on the back and further enables a high power to be displayed.

For the object, first, a movable blower is constructed by mounting a blower on moving means, attaching a discharge pipe to the blower, and connecting the power of a driving motor to the blower.

Among them, the moving means is provided with a wheel so as to reduce a moving load. Among wheels, it can be considered that a caster wheel is provided so as to easily change the direction in the lateral direction.

In order to enable the movable blower to be moved by being pushed with hands, handles may be provided. In order to enable the handle position to be adjusted to the position which is the most convenient for each worker to operate, the handles may be supported by the moving means so that a position in the vertical direction can be adjusted.

It is a second object to solve problems of noise and exhaust which occur in a conventional gasoline engine.

For this purpose, an electric motor is used as the driving motor. The power source (battery) may be mounted on the moving means or separated from the moving means, connected to the electric motor via a conductor or remote-controlled.

It is a third object to provide a movable blower whose nozzle position is vertically adjustable.

In order to achieve the object, the blower is supported by the moving means swingably and is inclined upward or downward, thereby enabling a discharge pipe position to be adjusted in the vertical direction.

Further, in order to facilitate the operation of the vertical position adjustment of the discharge pipe and achieve the construction by which a light operating force is sufficient, the response is high, and durability of members is good, the swing fulcrum of the blower with respect to the moving means is disposed below the blower and a linking mechanism for vertically moving the blower is disposed in a position higher than at least the swing fulcrum. The handle provided for the moving means is provided with a lever. A cable is interposed between the lever and the linking mechanism. When the lever is operated, the cable is moved and the blower is inclined in either upward or downward with respect to the moving means.

It is a fourth object to provide a movable blower in which the nozzle position can be adjusted to the right and left sides in the travel direction.

In order to achieve the object, a discharge pipe is supported by the blower so as to be swingable to the right and left. By swinging the blower to the right and left, the discharge pipe position can be adjusted to the right and left.

Further, in order to perform the operation of the adjustment of the position of the discharge pipe in the lateral direction by a handle, the handle attached to the moving means is provided with a lever and a cable is interposed between the lever and a discharge pipe. When the lever is operated, the cable is moved to thereby swing the discharge pipe to either the right or left with respect to the blower. A pair of levers and a pair of cables are provided so that the discharge pipe can be swung to both of the right and left sides.

While the operation can be performed by the handle as described above, further, in order to achieve the construction such that a light operation force is sufficient, the response is high, and the members are durable, a first cable is extended from the discharge pipe, an actuating member is provided to move the first cable in one direction, and a second cable is interposed between a lever attached to the handle and the actuating member. When the lever is operated, the actuating member is retained by the first cable to move the first cable in one direction and the discharge pipe is turned either to the right or left with respect to the blower.

Among them, in order to more certainly perform the right and left swing with simple construction, the first cable takes the form of an endless cable and is wound around the discharge pipe, and a part of the cable is fixed to the discharge pipe.

In order to return the discharge pipe to the initial position certainly and promptly when the lever operation is cancelled, an urging member is connected to the first cable. When the operating force to the lever is cancelled, the retaining of the actuation member by the first cable is released, the urging member urges the first cable, and the discharge pipe is returned to the initial position.

In the above-mentioned construction, in order to swing the discharge pipe to both of the right and left sides, a pair of actuating members, a pair of levers, a pair of second cables, and a pair of urging members may be provided.

DETAILED DESCRIPTION OF THE PREFERRED EMBODIMENTS

Figure 1:
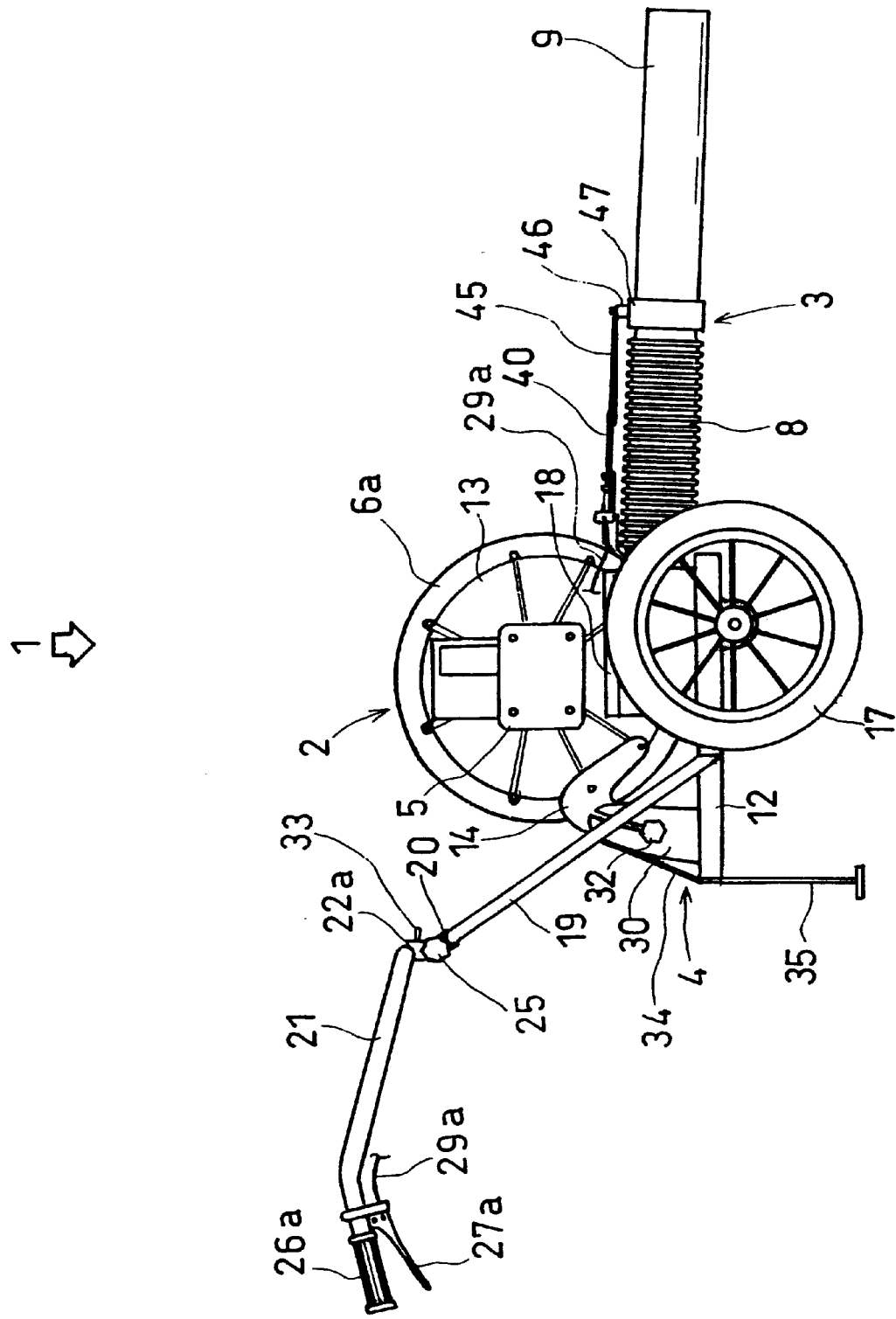
FIG. 1 is a side view of a movable blower according to a first embodiment of the invention.
Figure 2:
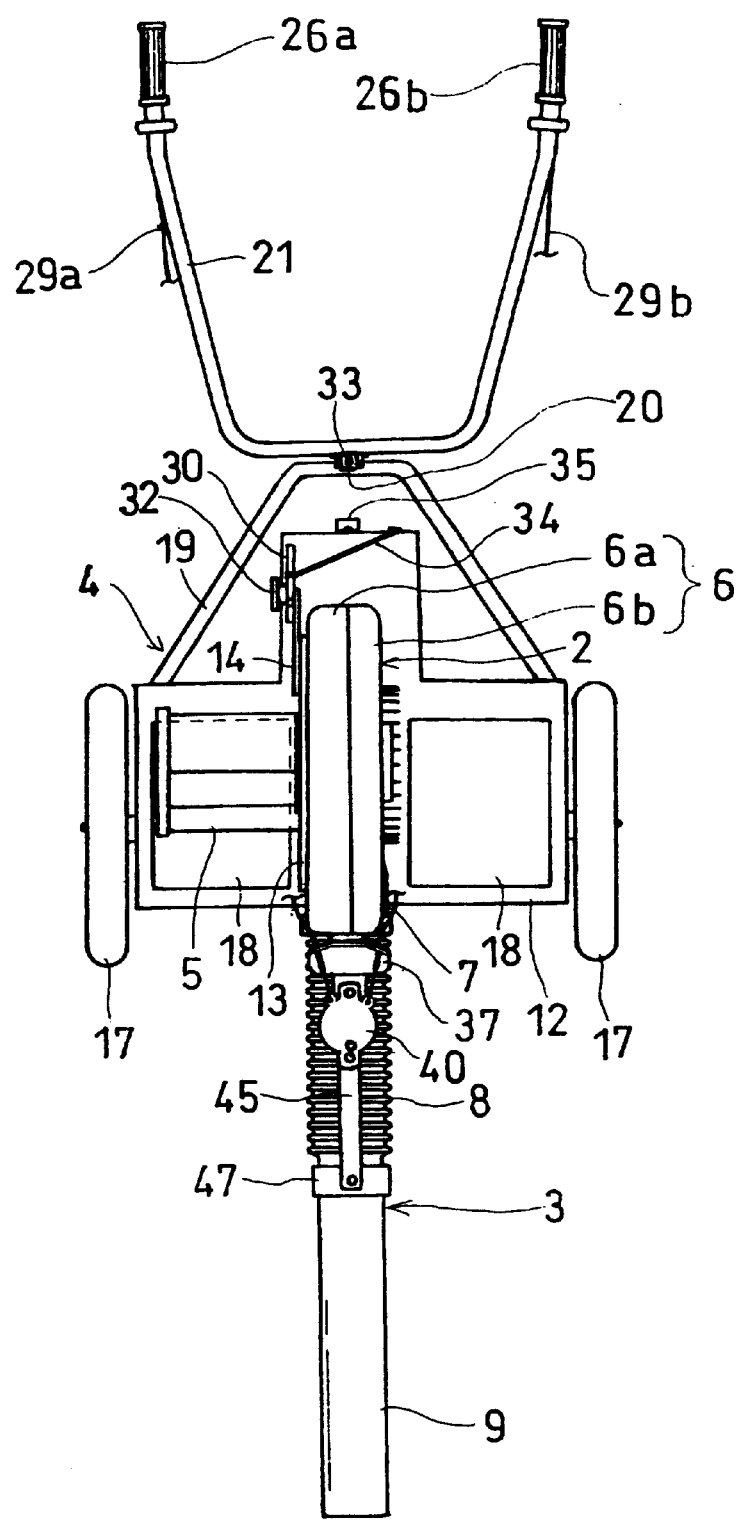
FIG. 2 is a plan view of the same.
Figure 3:
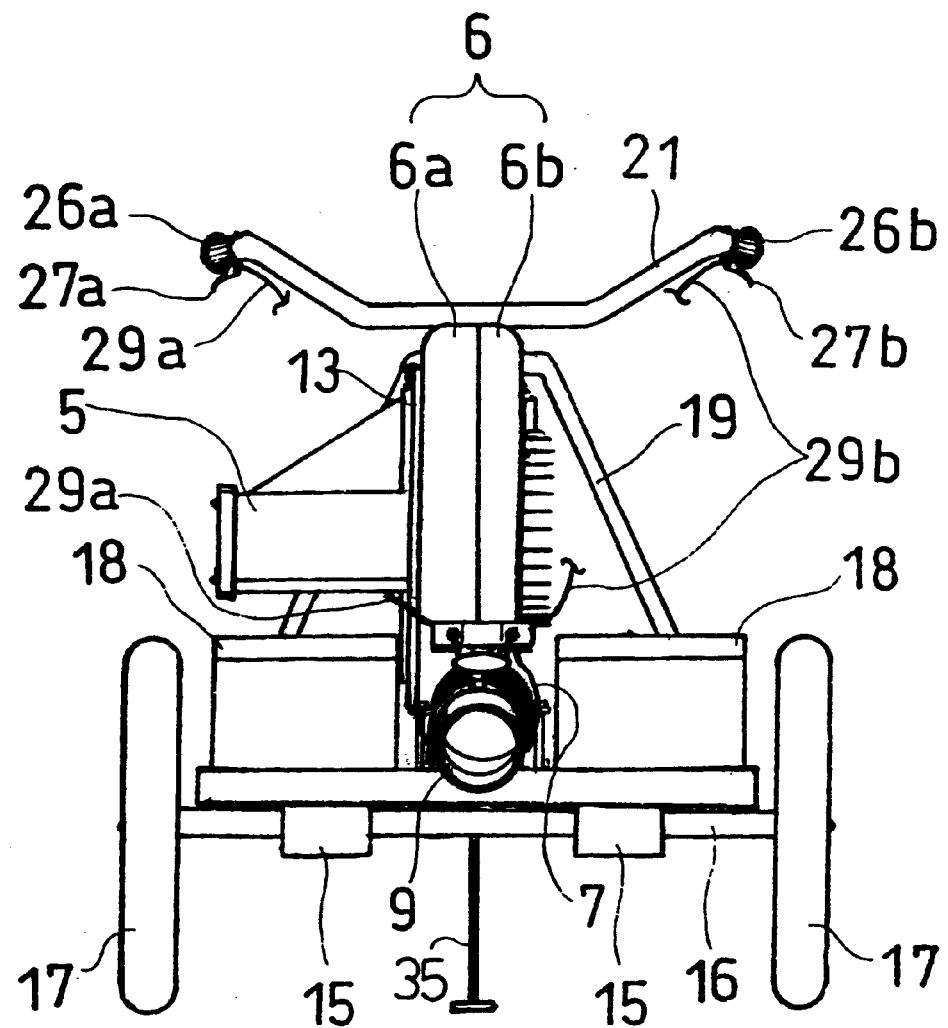
FIG. 3 is a front view of the same.

The general construction of a movable blower 1 of the first embodiment will be described with reference to FIGS. 1 to 3. A pair of wheels 17 are provided on the left and right sides of a base 12 having a "T" letter shape in plan view, which extends forward, leftward and rightward. A frame 19 is provided substantially upright on the rear end portion of the base 12 and a handle 21 is extended rearwardly from the top of the frame 12. The base 12 with the wheels 17, the frame 19 and the handle 19 constitutes moving means 4. A pair of batteries 18 are arranged on the right and left side portions of the base 12, and a blower 2 is mounted on almost the lateral middle portion of the base 12 between the batteries 18.

The moving means 4 will be described in detail. On the under surface of the base 12, as illustrated in FIG. 3, a pair of axle supports 15 are fixed on the right and left sides with respect to the center, an axle 16 rotatably penetrates the axle supports 15 in the lateral direction and is projected from the right and left ends of the base 12, and the pair of wheels 17 are fixed to the both ends of the axle 16. With the construction of the moving means 4, the movable blower 1 can be moved in its longitudinal direction.

It is also possible to relatively rotatably attach the wheels 17 to the axle 16 so that the two wheels 17 can rotate differentially to facilitate a right turn and a left turn when the movable blower 1 is moved.

The frame 19 having an almost inverted V shape in front view extends from the rear end of the base 12 so that the rear part is inclined upward. A handle attaching part 20 is provided so as to protrude upward from the top end of the frame 19 and the front end of the handle 21 is attached to the handle attaching part 20. The handle 21 further extends rearward on the right and left sides. Grips 26a and 26b are formed at the right and left rear ends of the handle 21. Just below the grips 26a and 26b, nozzle operation levers 27a and 27b which will be described hereinlater are arranged.

Figure 6:
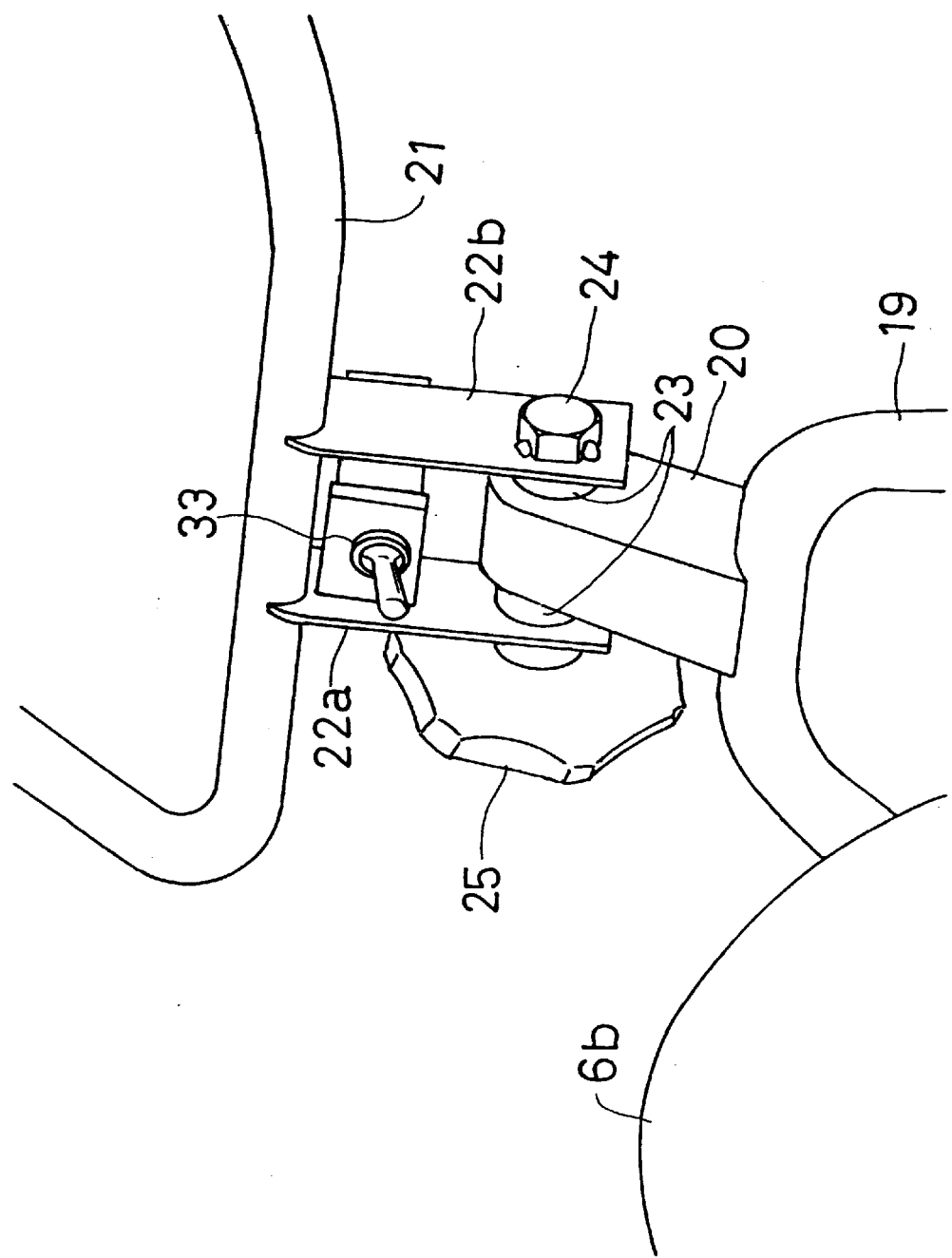
FIG. 6 is a partially enlarged perspective view of the movable blower in which a handle is supported on the moving means so that the position is adjustable in the vertical direction.
Figure 7:
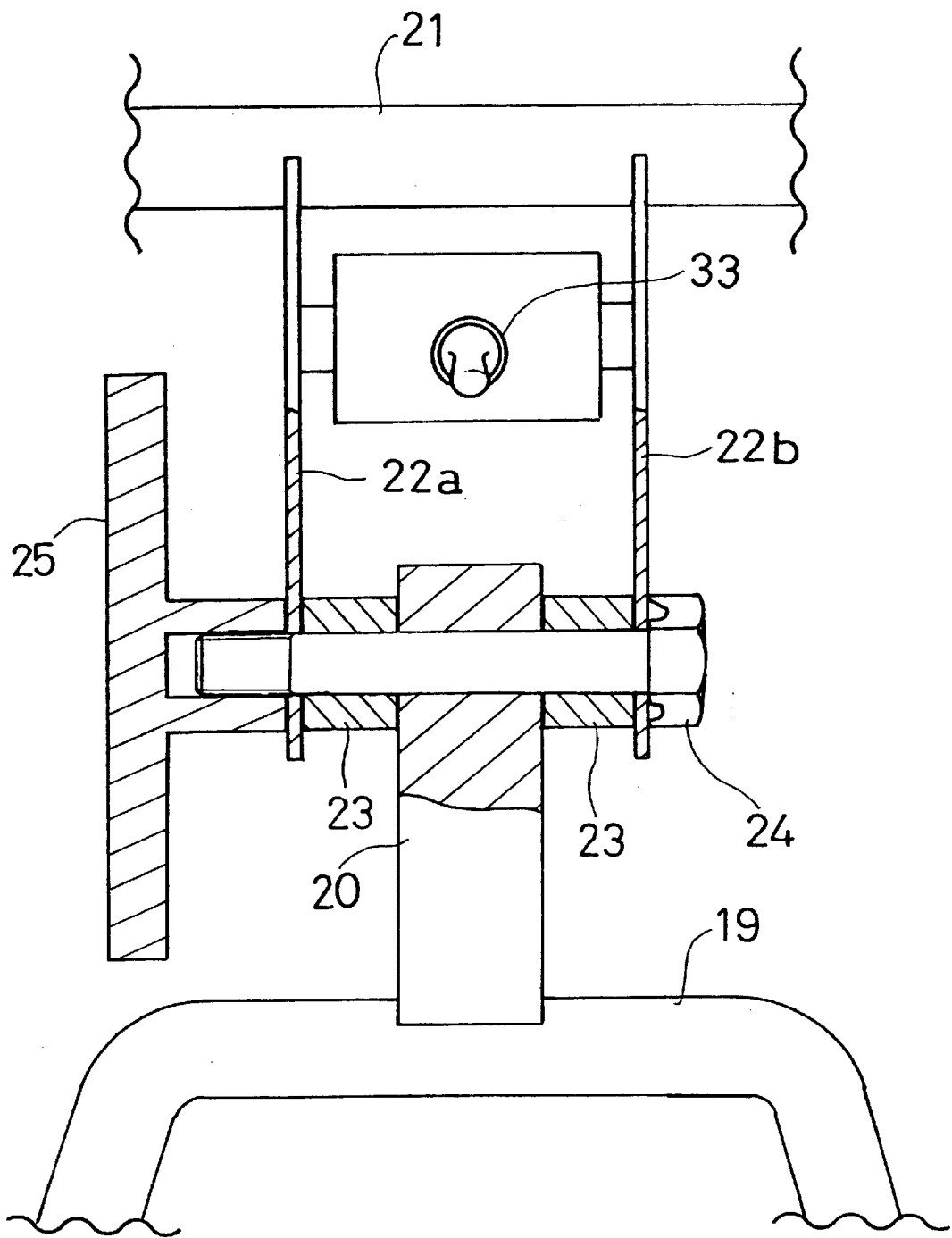
FIG. 7 is a partially enlarged rear view cross section of the same.

The construction of the handle attaching part 20 and its peripheral part will be described with reference to FIGS. 6 and 7. In the center part in the lateral direction of the front end of the handle 21, two handle coupling plates 22a and 22b are provided in the symmetrical positions so as to project downward and the upper part of the handle attaching part 20 is inserted in a space defined by the two handle coupling plates 22a and 22b. Two rings 23 and 23 are arranged so as not to be loose between the two handle coupling plates 22a and 22b and the handle attaching part 20. Through holes are opened in the lower part of each of the handle coupling plates 22a and 22b and the upper part of the handle attaching part 20. The coupling plates 22a and 22b, the handle attaching part 20, and the rings 23 and 23 are connected by a bolt 24 penetrated from the outside of the handle coupling plate 22b and the head of the bolt 24 is fixed to the outer surface of the handle coupling plate 22b so as not to be rotatable.

On the other hand, a handle tilt knob 25 is attached to the outside of the handle coupling plate 22a, a female screw which engages with the bolt 24 is formed in the axis center of the knob 25 and a male screw of the bolt 24 is screwed and fixed into the female screw. Consequently, the handle coupling plates 22a and 22b and the handle attaching part 20 are sandwiched by the head of the bolt 24 and the knob 25 so as to be firmly fixed.

When the knob 25 is rotated in the direction of loosening the bolt 24, the handle 21 becomes rotatable around the bolt 24 as a swing fulcrum and the tilt angle of the handle 21 can be changed. At a desirable angle, the knob 25 is rotated in the opposite direction, so that the handle 21 is fixed at the angle by fastening the bolt 24. As described above, the angle of the handle 21 can be adjusted according to the height of the worker or the like.

A switch 33 is sandwiched by the handle coupling plates 22a and 22b above the handle attaching part 20 and fixed to the handle coupling plates 22a and 22b. The switch 33 is connected to an electric motor 5 and the batteries 18 via not-shown conductors and the actuation of the electric motor 5 is controlled by the switch 33.

The arrangement of the switch is an example. Since the other arrangements are possible, the invention is not limited to the embodiment.

A stand 35 is fixed in the center in the lateral direction of the rear end face of the base 12 and is lowered perpendicularly. In a case such that the movable blower 1 is housed, the lower end of the stand 35 is made come into contact with the ground to support the rear part of the frame 12, thereby enabling the blower 1 to be stably housed in a storage.

When the movable blower 1 is used for cleaning or the like, by slightly lifting up the handle 21 by the worker, the stand 35 is moved apart from the ground and the self-weight of the movable blower 1 acts on the wheels 17 and 17 on the right and left sides of the base 12. The movable blower 1 can be therefore freely moved in its longitudinal direction. It is also possible to construct in such a manner that the stand 35 can be jumped up like the stand of a bicycle or the like so that the stand 35 is not rubbed against the ground at the time of movement.

The blower 2 will now be described with reference to FIGS. 1 to 5 and the like. The blower 2 is constructed by covering a blower fan (not shown) with a hollow disc-shaped blower casing 6, the electric motor 5 as a driving motor is attached to one side of the blower casing 6, and the power of the output axis of the electric motor 5 is connected to the centrifugal blower fan (not shown) provided in the blower 2. An air intake is opened on the other side of the blower casing 6. A discharge pipe 3 is extended to the front from a blast port 7 formed in the lower part on the front side of the blower casing 6. The blower 2 leads an outside air from the air intake into the blower casing 6 by the blower fan driven by the electric motor 5 and discharges the air from the opening on the front end via the discharge pipe 3.

The electric motor 5 is connected to the batteries 18 and 18 via not-illustrated conductors to receive a power.

Figure 4:
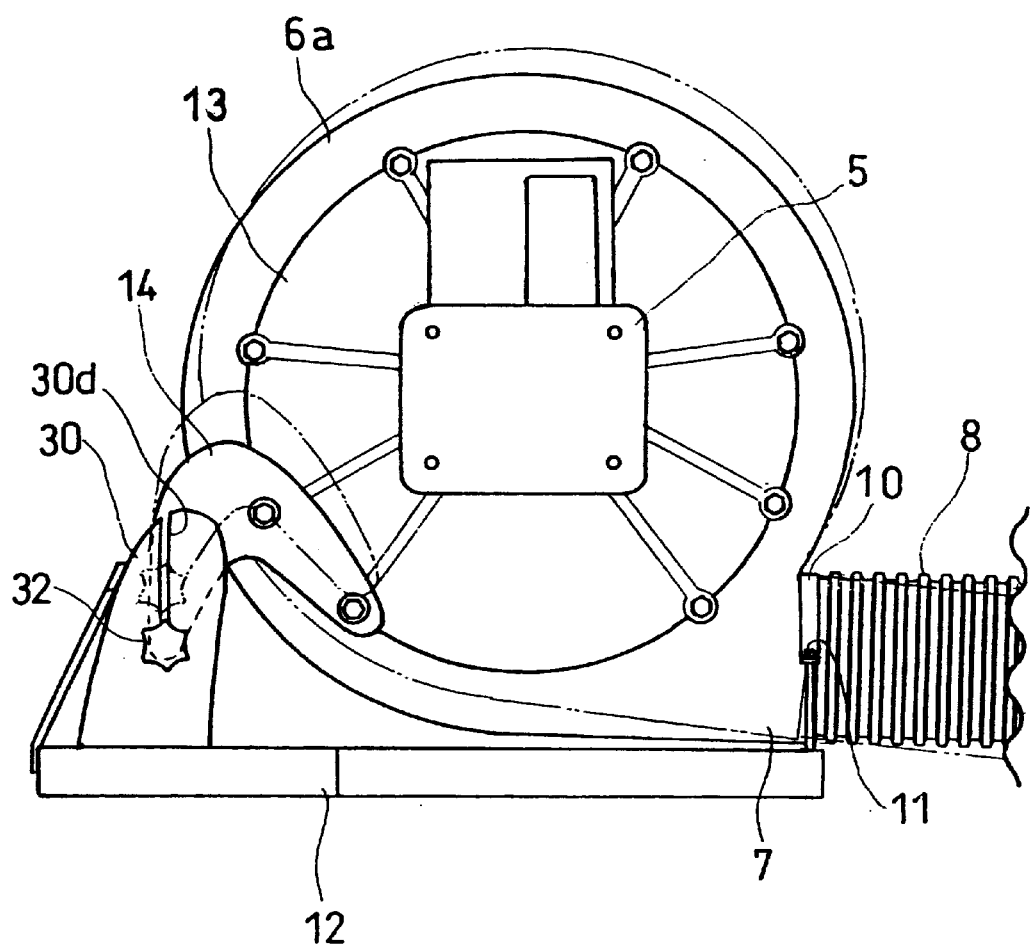
FIG. 4 is a partially enlarged side view of the movable blower having a construction in which a blower is supported on a frame rotatably in the vertical direction.
Figure 5:
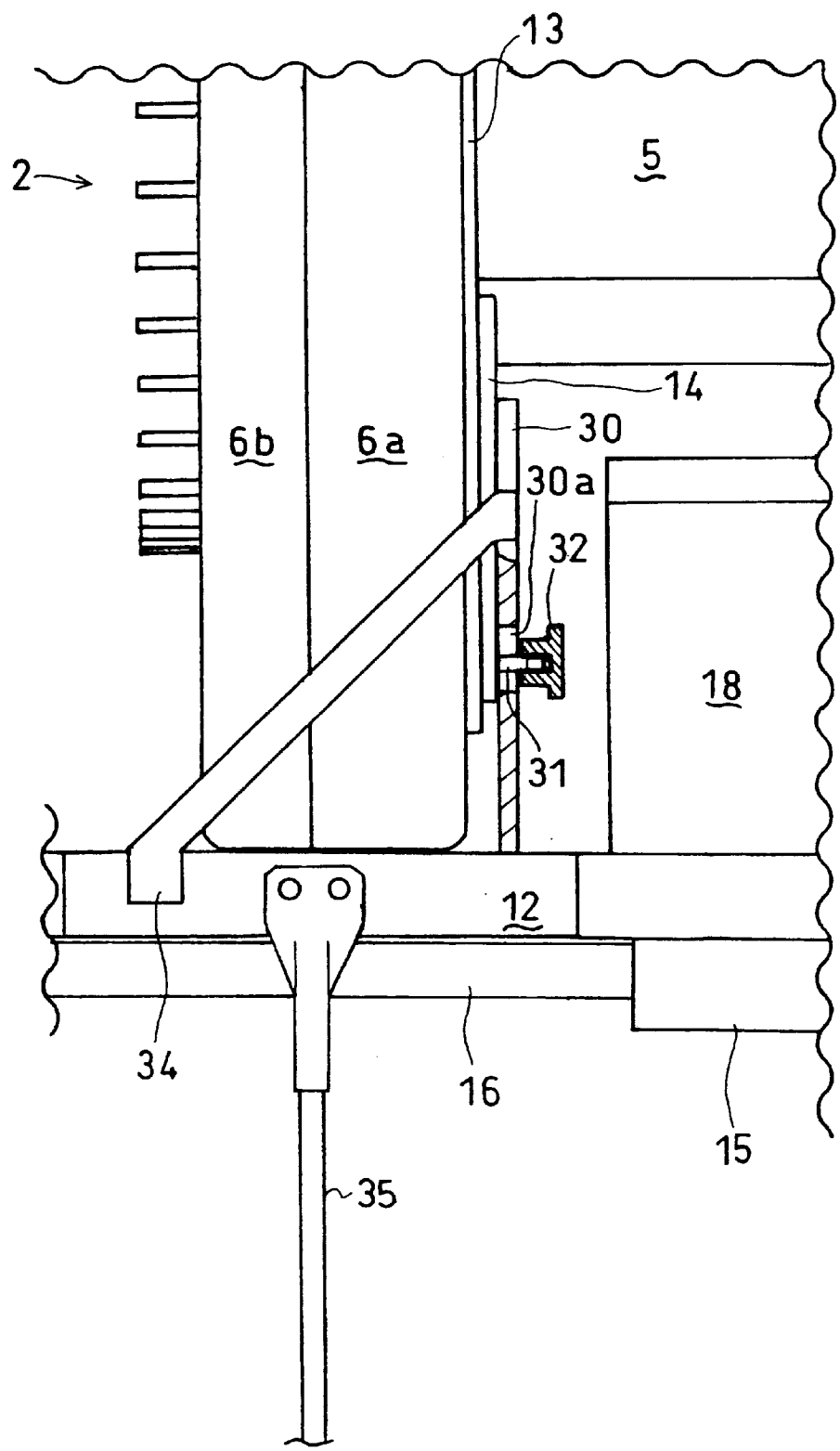
FIG. 5 is a partially enlarged rear view cross section of the same.

The blower casing 6 can be split into a left-half part 6a and a right-half part 6b. The air intake is opened in the right-half part 6b. As shown in FIGS. 4 and 5, the electric motor 5 is attached to the left-half part 6a via a disc-shaped motor attaching plate 13. Specifically, the output shaft of the electric motor 5 is inserted into the opening (not shown) formed in the center part of the motor attaching plate 13 and projected to the inside of the blower casing 6, thereby interlockingly connecting the blower fan in the blower casing 6.

In FIG. 4, for convenience of explanation, the wheels, handle supporting member, batteries, stand, pipe, and the like are omitted.

As shown in FIGS. 4 and 5, a bent flat plate-shaped coupling member 14 is fixed in the lower rear position on the outer surface of the motor attaching plate 13. On the other hand, on top face of the rear part of the base 12, a bracket 30 is vertically formed facing upward in parallel to and partially overlaps the coupling member 14 in side view. A vertical guide groove 30d having an opened upper end is formed in the bracket 30.

One end of a bracket supporting frame 34 is fixed on the rear end face of the base 12, the frame 34 is extended obliquely upward, and the tip of the one end is fixed to the rear part of the bracket 30, thereby supporting and reinforcing the bracket 30.

In the coupling member 14, a pin 31 is horizontally attached so as to be projected to the outside in a position where the pin 31 overlaps the bracket 30 in side view. The pin 31 is inserted into the guide groove 30d and projected to the outside and a male screw is formed at the projected end. On the other hand, a female screw is formed in a knob 32 and screwed on the male screw at the projected end of the pin 31 and fixed, thereby fixing the coupling member 14 and the bracket 30 in a coupled state.

Figure 8:
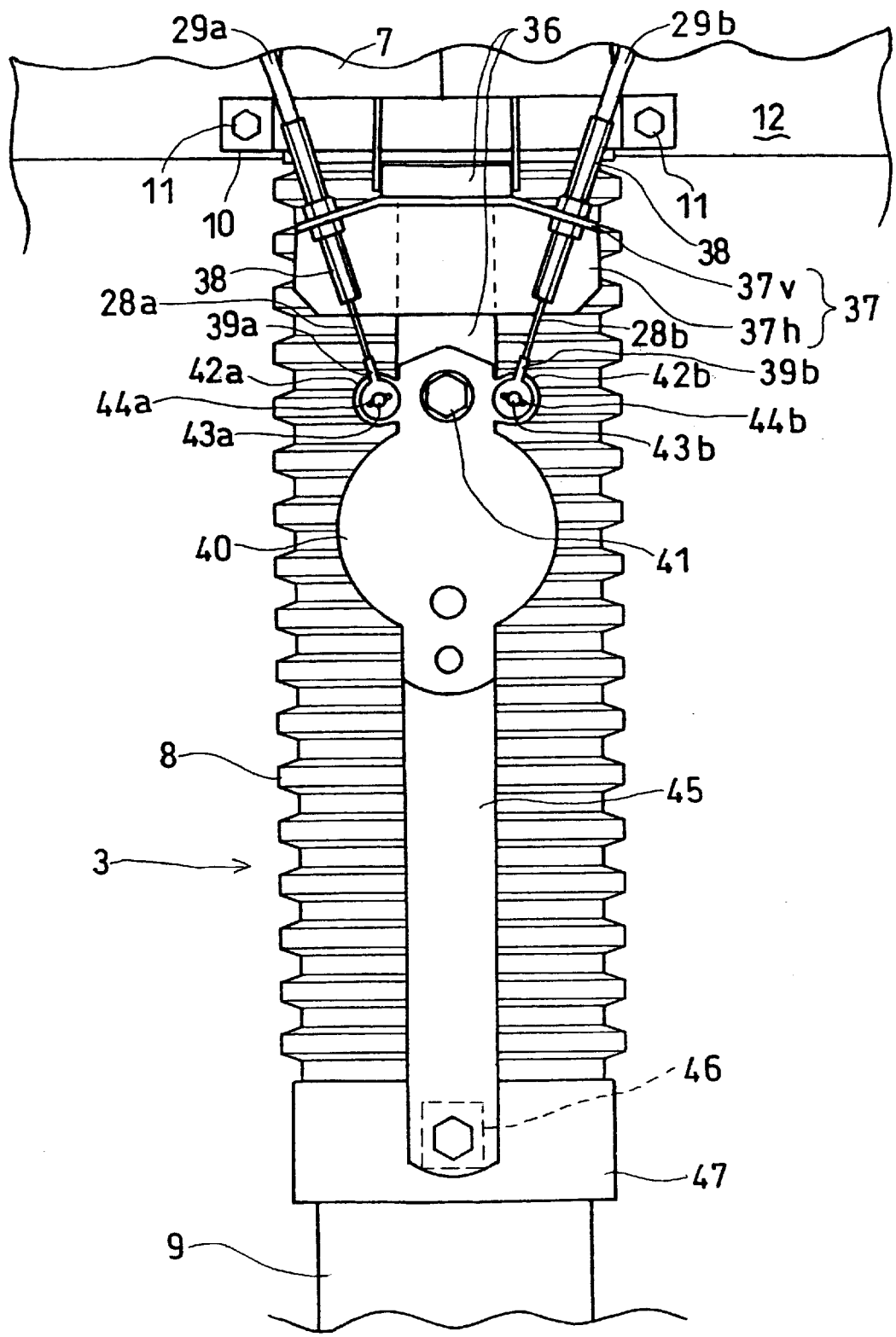
FIG. 8 is a partially enlarged plan view of the movable blower showing a coupling construction of a discharge pipe and wires.
Figure 9:
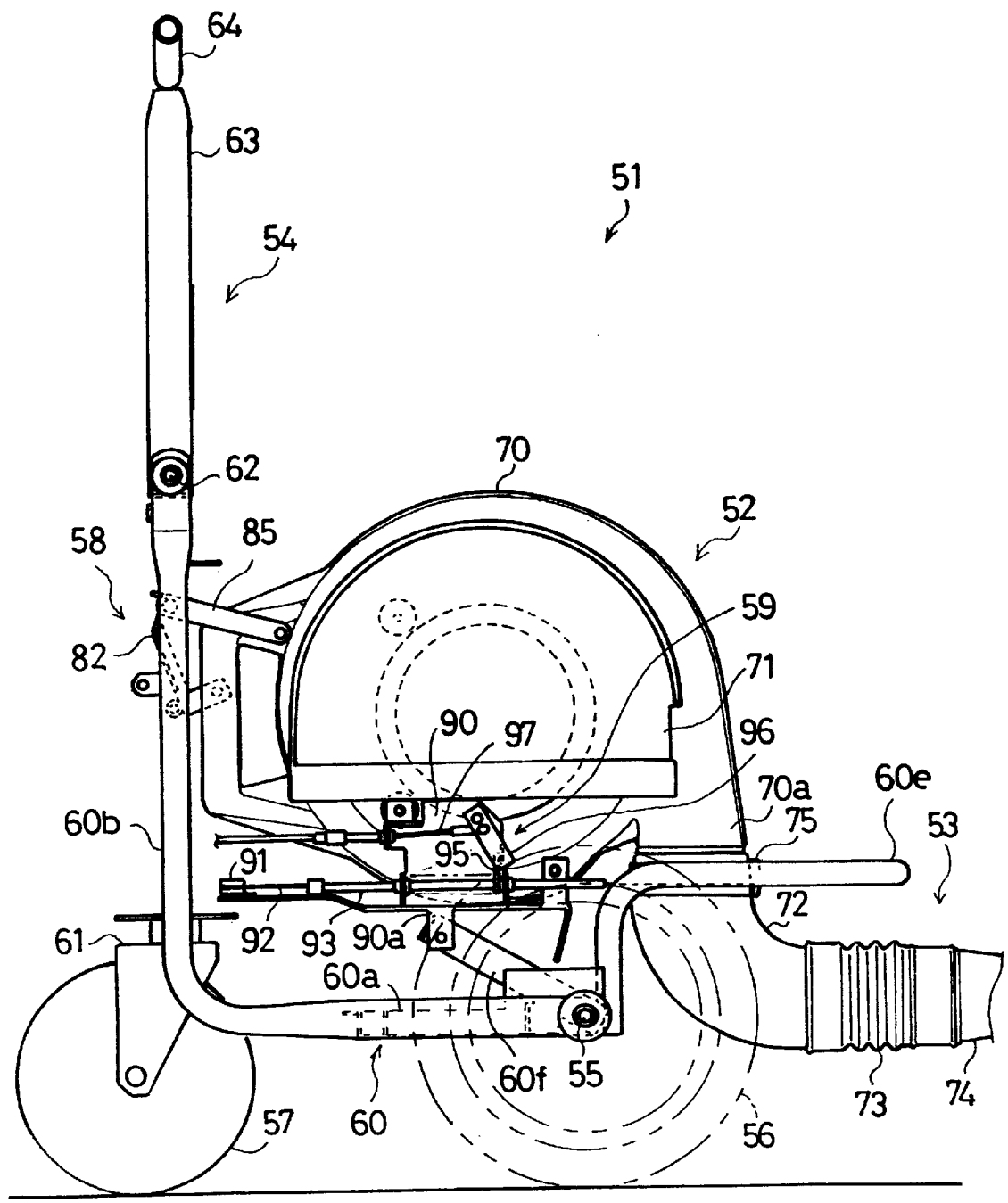
FIG. 9 is a right side view of a movable blower according to a second embodiment of the invention.
Figure 10:
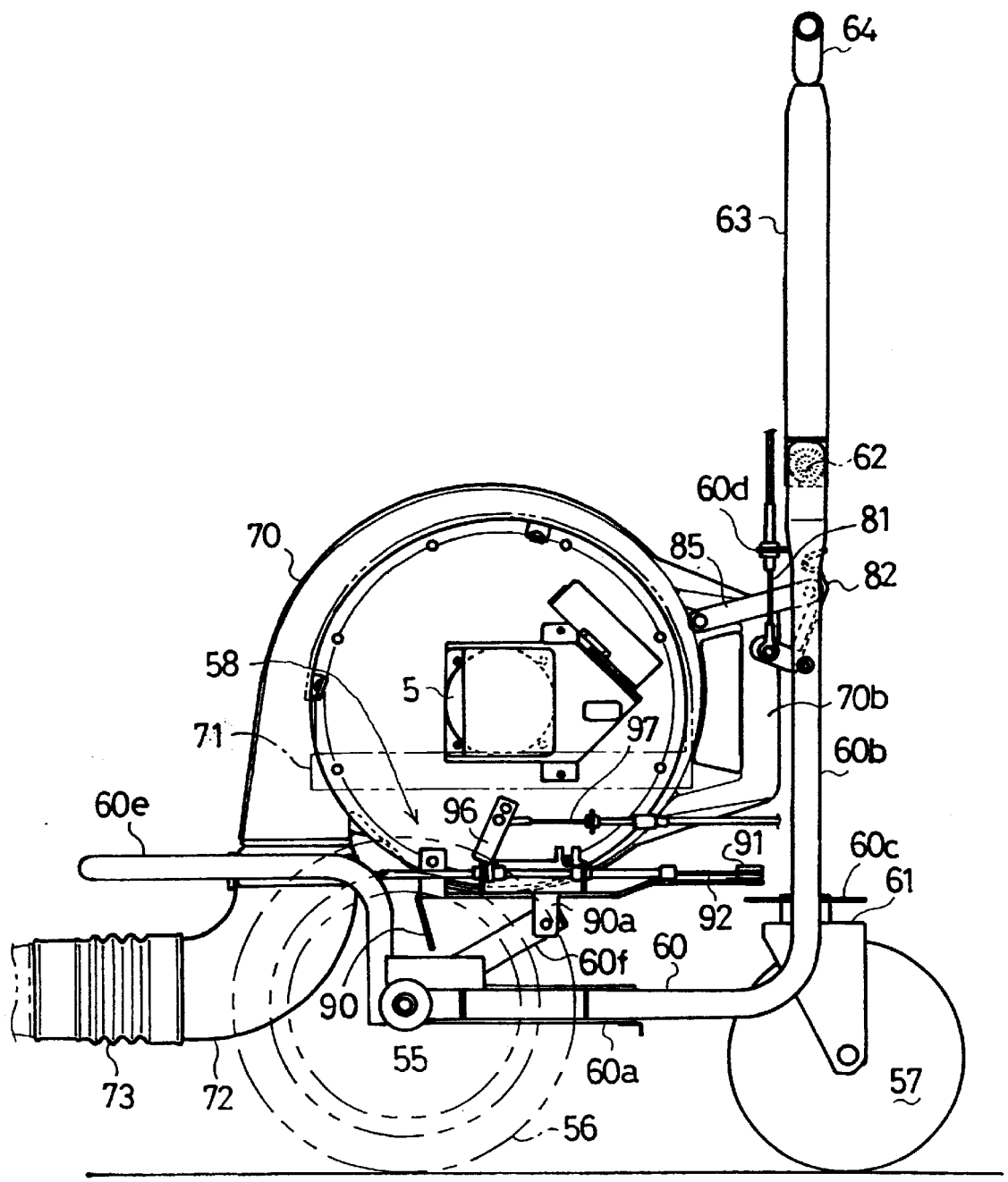
FIG. 10 is a left side view of the same from which a cowling is removed.
Figure 11:
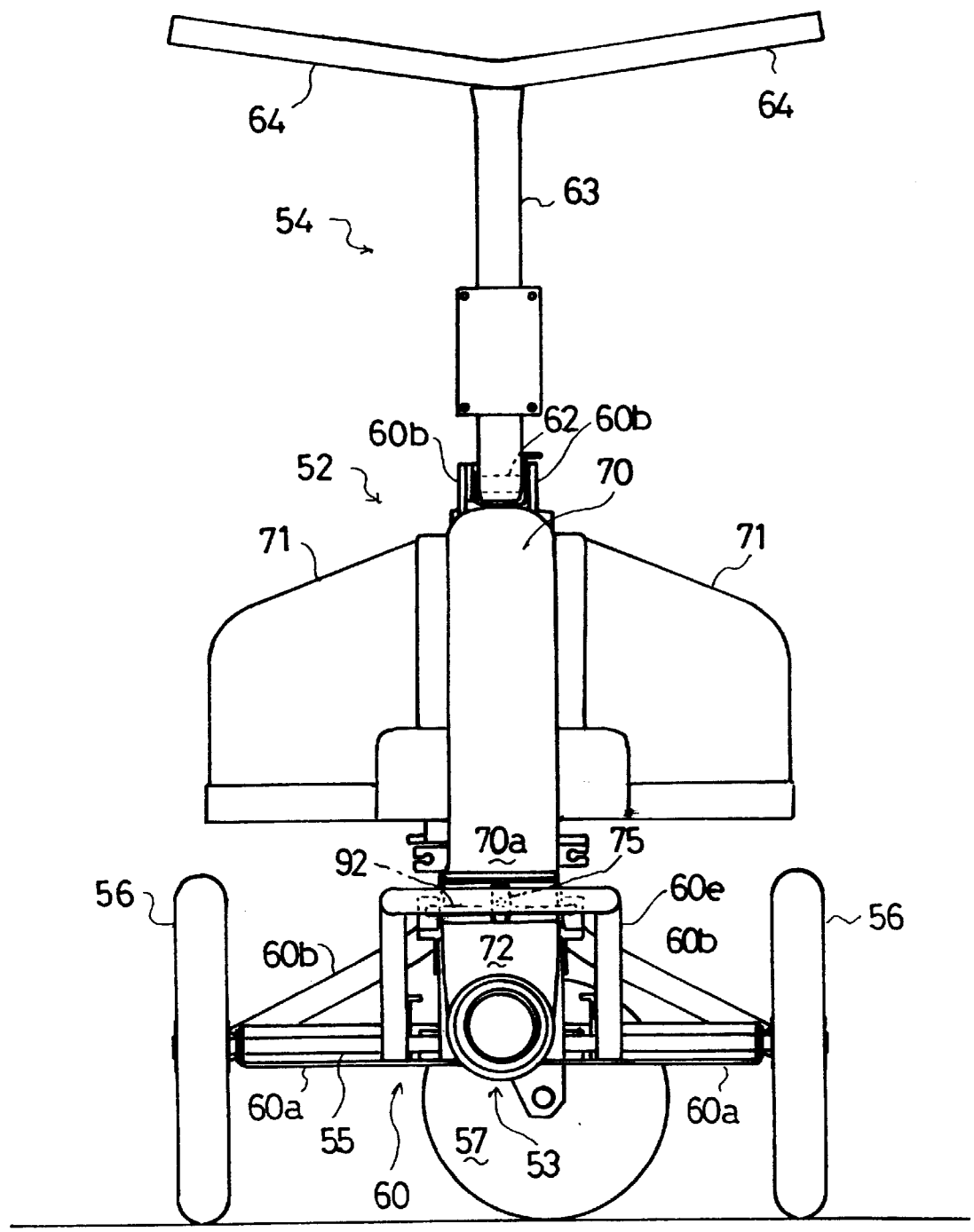
FIG. 11 is a front view of the same.
Figure 12:
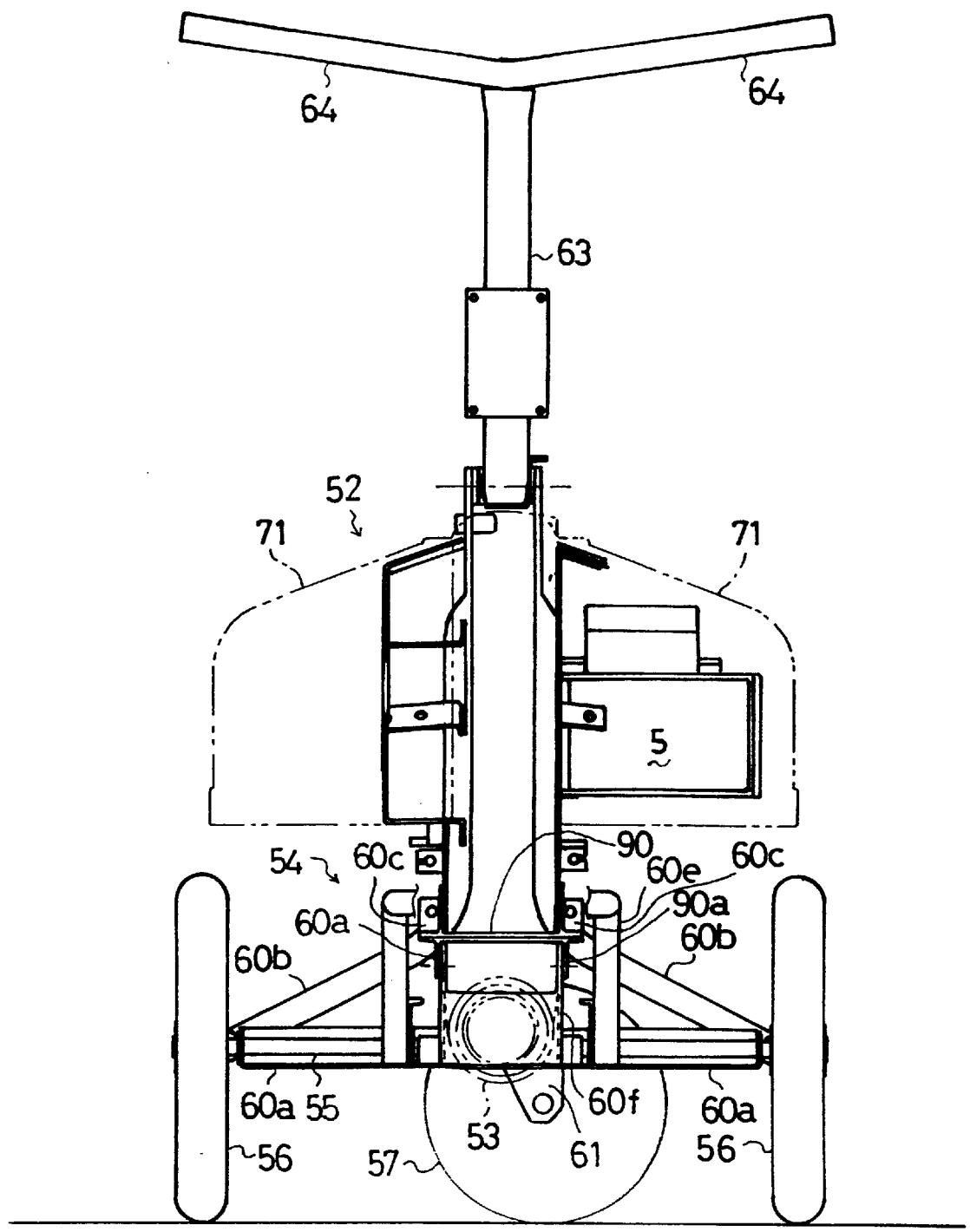
FIG. 12 is a front view of the same from which a pair of cowlings and a blower casing are removed.
Figure 13:
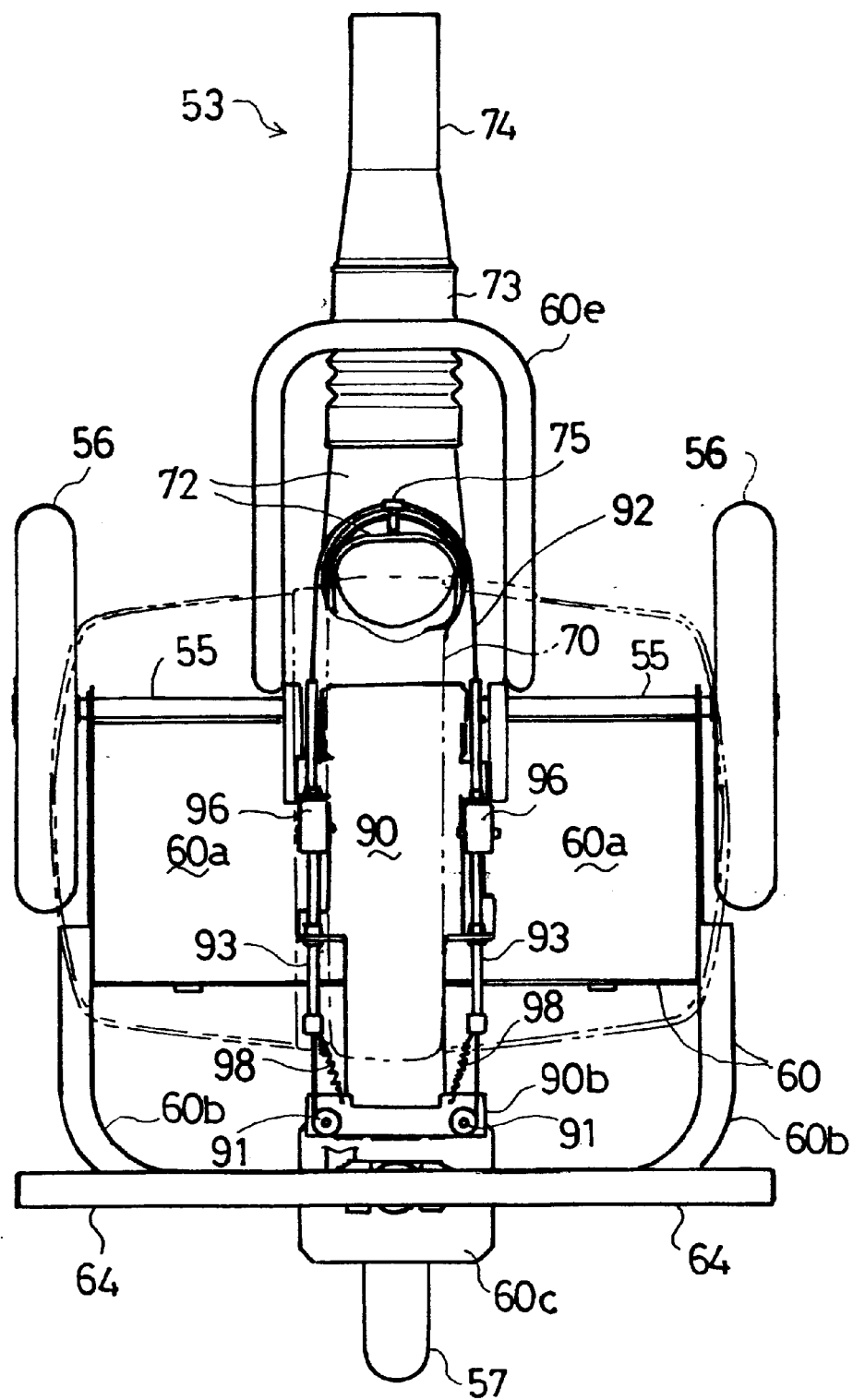
FIG. 13 is a plan view of the same from which a pair of cowlings and a blower casing are removed.

Meanwhile, as shown in FIGS. 4 and 8, an arch band hardware 10 is provided along the upper part of the outer peripheral surface of the blast port 7 in the front lower part of the blower 2 and the right and left ends of the band hardware 10 are screwed in the center position in the lateral direction of the front end part of the base 12 by long-legged bolts 11 and 11.

As shown in FIG. 4, therefore, when the knob 32 is rotated in the direction of loosening the screw of the pin 31, the pin 31 projected to the coupling member 14 becomes slidable along the guide groove 30d of the bracket 30 and the vertical inclination mounting angle of the blower 2 to the base 12 can be changed. In this case, the blower 2 swings around the band hardware 10 attached along the upper end of the blast port 7 as a fulcrum and is lifted. When the vertical inclination mounting angle of the blower 2 becomes a desired angle, the knob 32 is rotated in the opposite direction. Consequently, the coupling member 14 and the bracket 30 are fixed by fastening of the knob 32 and the blower 2 is fixed to the base 12 at the desired vertical inclination mounting angle. In such a manner, by adjusting the vertical inclination angle of the blower 2, the air discharge vertical position of the tip of the nozzle 9 can be adjusted.

The construction of the discharge pipe 3 will be described with reference to FIGS. 4 and 8 and the like. The discharge pipe 3 is constructed by having a nozzle 9 in the front part and interposing a flexible hose 8 between the rear end of the nozzle 9 and the blast port 7.

A tongue piece 36 is fixedly extended from the upper end of the band hardware 10 to the front and a pipe supporting stay 37 is attached on the top face of the tongue piece 36. The stay 37 is formed in an L-letter shape in cross section having a horizontal part 37h and a vertical part 37v. The under face of the horizontal part 37h is fixed on the top face of the tongue piece 36. Both right and left sides of the vertical part 37v are bent slightly in the direction of facing each other and a through hole is opened in each of the right and left sides. A pipe-like fixing member 38 is inserted into each of the through holes and fixed and front ends of cable tubes 29a and 29b wrapping wires 28a and 28b whose rear ends are fixed to right and left levers 27a and 27b of the handle 21 are inserted in the fixing members 38. The wires 28a and 28b are led from the ends of the cable tubes 29a and 29b to the front more than the fixing member 38 and ring-shaped tabs 39a and 39b are fixed to the tips of the wires 28a and 28b.

The tongue piece 36 is extended to the front more than the pipe supporting stay 37 and an almost disc shaped swing member 40 is mounted so as to be swingable by a bolt shaft 41. The swing member 40 is provided with circular tabs 42a and 42b on both right and left sides of the bolt shaft 41 and retaining shafts 43a and 43b are provided so as to project upward from the tabs 42a and 42b. The tabs 39a and 39b are placed on the tabs 42a and 42b, the retaining shafts 43a and 43b are upwardly inserted into the holes of the tabs 39a and 39b, and horizontal pins 44a and 44b for preventing coming off are inserted into protruded parts from the taps 39a and 39b of the retaining shafts 43a and 43b.

The rear end of an elongated tongue piece 45 is fixed to the front end of the swing member 40. The tongue piece 45 is extended along the upper end of the hose 8. The front end of the tongue piece 45 is disposed on the upper end of a wide-mouthed joint part 47 at the front end of the hose 8. A tab 46 is fixed on the upper end of the joint part 47, and the front end of the tongue piece 45 is placed on the tab 46 and pivotally supported. The rear end of the nozzle 9 is inserted in the joint part 47.

As mentioned above, the cables are connected between the nozzle operation levers 27a and 27b provided for the handle 21 and the discharge pipe 3. For example, when the worker grips the left-side lever 27a, the wire 28a is pulled backward, the left tab 42a of the swing member 40 is pulled backward, and the swing member 40 swings to the left about the bolt shaft 41 as a center. As a result, the tongue piece 45 is tilted to the left side, the hose 8 which is provided along the tongue piece 45 is bent to the left side, and the opening at the tip of the nozzle 9 is directed to the left side. Similarly, by griping the right-side lever 27b, the opening at the tip of the nozzle 9 is directed to the right side. By the griping operation of the right and left nozzle operation levers 27a and 27b, the nozzle 9 is directed to either the right or left side and the discharge position of air can be moved to the right and left sides.

A movable blower 51 of the second embodiment will be described with reference to FIGS. 9 to 21. As illustrated in FIGS. 9 to 15, the movable blower 51 comprises a blower unit 52, a discharge pipe 53, and moving means 54.

Figure 15:
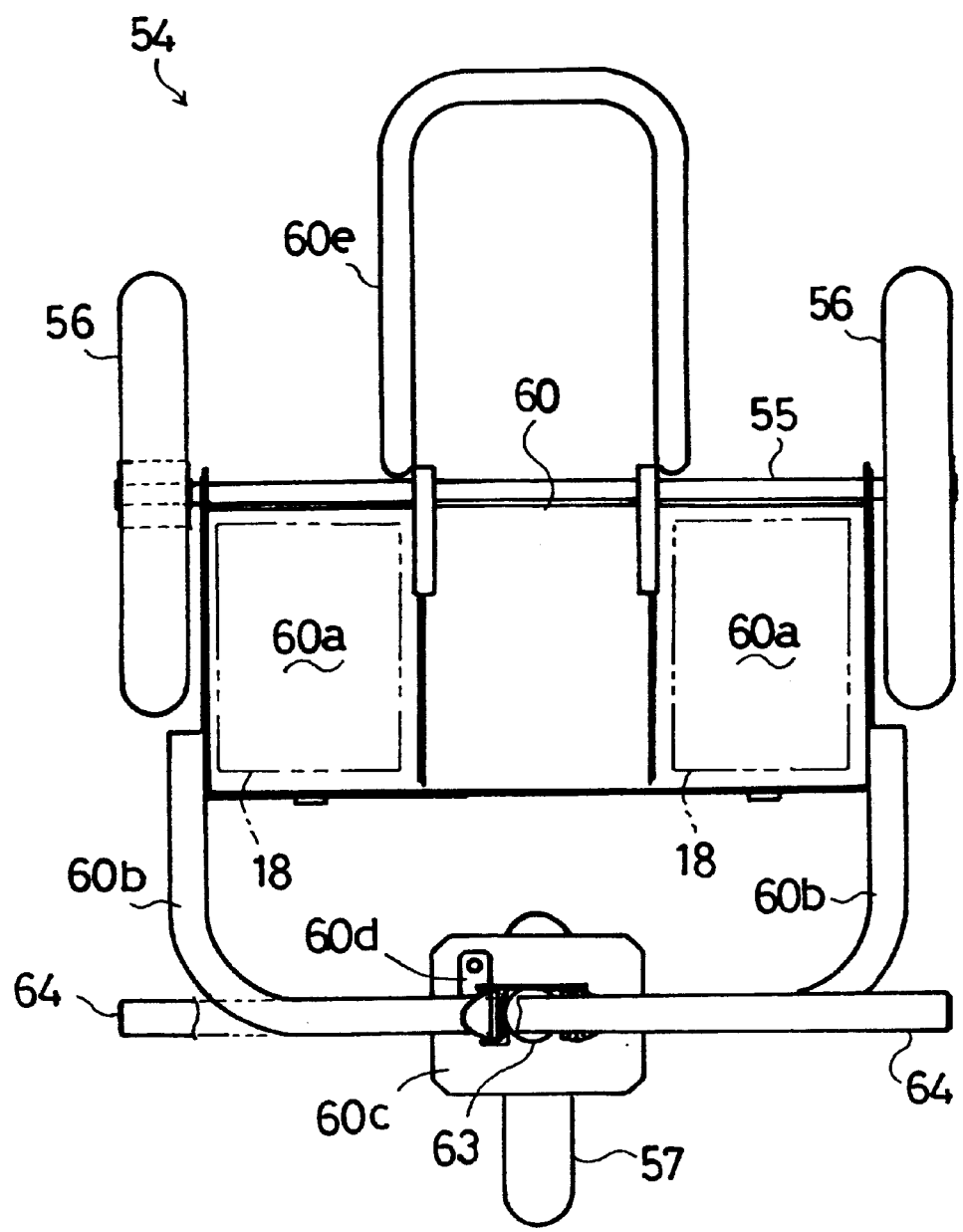
FIG. 15 is a plan view of moving means of the same movable blower.

The moving means 54 will now be described. In a main frame 60, a laterally-long plate-shaped battery base 60a is formed as illustrated in FIG. 15. On the battery stand 60a, a pair of the batteries 18 can be mounted left and right. An axle 55 is supported in the lateral direction just in front of the battery base 60a and a pair of wheels 56 are rotatably supported at both ends of the axle 55. A pair of (upright) handle supports 60b are narrowed in an inverted V shape in front view and then upwardly extended in parallel. A fork stay 60c is disposed in the narrowed part of the handle supports 60b, the upper end of a fork 61 is pivotally supported by the fork stay 60c and extended downward. A tail wheel 57 as a caster wheel is rotatably sandwiched by the fork 61.

The upper ends of the pair of handle supports 60b are coupled by a coupling shaft 62, the lower end of a handle stem 63 is pivotally supported by the coupling shaft 62 in the back and forth (up and down) directions, left and right hand grips 64 are extended from the upper ends of the stem 63, and nozzle operation levers 65L and 65R are provided just below the right and left hand grips 64. Like the support structure of the handle 21 to the frame 19 in the first embodiment, the handle stem 63 can be swung, positioned and fixed to adjust the height of the hand grip 64.

A control box 66 is disposed in a some midpoint in the stem 63. In the control box 66, a main switch, a battery meter, and the like (not shown) are arranged and the driving of the blower 52 is turned ON/OFF by the ON/OFF operation of the main switch. On either of the hand grips 64, a blast amount adjusting dial 67 for adjusting the blast amount of the blower by regulating the rotational speed of the electric motor is provided. The switch, dial, and the like are electrically connected to the electric motor 5 provided for the blower 52 which will be described hereinlater.

For back and forth movement, by evenly applying a force in the back and forth directions to the right and left hand grips 64, a rotational force is evenly applied to both of the wheels 56, the tail wheel 57 is directed in parallel to the wheels 56 and 56, that is, in the back and forth directions, so that the moving means 54 can be moved straight ahead. By applying a force in either the right or left direction to the right and left hand grips 64, the caster wheel 57 rotates in the direction of the applied force and the travel direction of the moving means 54 can be smoothly changed to the opposite side.

In the main frame 60, a discharge pipe stopper part 60e in a U-letter shape in plan view is extended from the battery stand 60a toward the front. Further, a pair of left and right masts 60f are extended from the right and left base ends of the discharge pipe stopper 60e so as to be inclined upward in the back direction.

The blower unit 52 which is swingably supported on the moving means 54 so as to be lifted will now be described. The blower unit 52 comprises a blower casing 70 for housing the blower fan, an electric motor 5 whose power is connected to the blower fan, on one side of the blower casing 70, and cowlings 71 and 71 having open lower ends, which are detachably attached from the right and left sides so as to sandwich the blower casing 70. The blower unit 52 covers the batteries 18 mounted laterally on the battery base 60a and one of the cowlings 71 covers the electric motor 5.

The blower casing 70 is fixedly supported by a blower frame 90 and right and left hinges 90a extended downward from the blower frame 90 are pivotally supported so as to be lifted on the right and left masts 60f of the main frame 60 in the moving means 54. As shown by the arrow A in FIG. 14, the whole blower unit 52 is supported swingably so as to be lifted with respect to the moving means 54. In a state where no force is applied, since the blower unit 52 has the center of gravity in the front part with respect to the pivot point, the blower unit 52 tends to be inclined forward.

An air intake (not shown) is opened on one side of the blower casing 70, an outside air is led from the air intake into the blower casing 70 and is sent by the rotation of the blower fan from a blast port 70a formed in the front lower part of the blower casing 70 via the discharge pipe 53 toward the front. The cowlings 71 are formed so as to introduce the outside air into the blower casing 70.

With respect to the discharge pipe 53, the upper end of a bent pipe 72 is attached to the lower end of the blast port 70a so as to be bendable in the horizontal direction. The bent pipe 72 is extended downward, bent in a some midpoint, and extended to the front. A flexible hose 73 is extended from the front end of the bent pipe 72 to the front and a nozzle 74 is extended from the front end of the hose 73 to the front.

A discharge pipe stopper 60e formed in front of the main frame 60 is extended in a U shape in plan view which passes by the right and left outer sides of the blast port 70a. Between the front end of the discharge pipe stopper 60d and the blast port 70a, there is a clearance so as to allow the lifting of the blower unit 52 as shown by the arrow A in FIG. 14. In a state where no force is applied, the blower unit 52 is tilted forward as described above and is stopped in a state where the lower end of the front end of the nozzle 74 comes into contact with the ground. When the front end of the blower unit 52, that is, the discharge pipe 53 is lifted by a vertical discharge position adjusting mechanism 58 which will be described hereinlater, the upper end of the discharge pipe 53 comes into contact with the discharge pipe stopper 60e and this position is the upper limit of the discharge pipe 53 position.

Next, explanation will be given on a vertical swing linking mechanism 58 and a lateral swing linking mechanism 59 for adjusting the air sending direction of the electric movable blower 51.

To begin with, the mechanism of adjusting the air discharge position of the movable blower 1 in the vertical and lateral directions will now be described. For the adjustment of a vertical inclination angle of the blower 2 for adjusting the vertical position of the tip of the nozzle 9, the mechanism as shown in FIGS. 4 and 5 and the like is provided under the blower 2. In the construction, the worker holds the blower 2, that is, the rear end part of the blower casing 6 and moves upward or downward, changes the position in the vertical direction of the pin 31 in the guide groove 30d of the bracket 30, and fixes the blower 2 by the knob 32. Since the distance between the band hardware 10 serving as a fulcrum of the lifting of the blower 2 and the rear end of the blower 2 is short, a large force is necessary to move the blower 2 in the vertical direction. Moreover, when the position in the vertical direction of the nozzle 9 is desired to be changed, it cannot be promptly changed, so that the operability is not good. A structure which can adjust the vertical inclination angle of the blower easier and freely when it is desired is therefore demanded.

With respect to the adjustment of the lateral inclination angle of the discharge pipe 3, since the wires 28*a* and 28*b* are extended from the swing member 40 disposed on the discharge pipe 3, that is, the hose 8 to the nozzle operation levers 27*a* and 27*b* arranged just below the grips 26*a* and 26*b* of the handle 21, the wires are long and a force to grip the levers 27*a* and 27*b* is required, so that the operation response is poor. Consequently, the construction in which the nozzle can be directed in the lateral direction with high response with an easier lever operation is desired.

The vertical swing linking mechanism 58 and the lateral swing linking mechanism 59 of the movable blower 51 of the second embodiment are constructed so as to solve such a problem in the movable blower 1.

Figure 14:
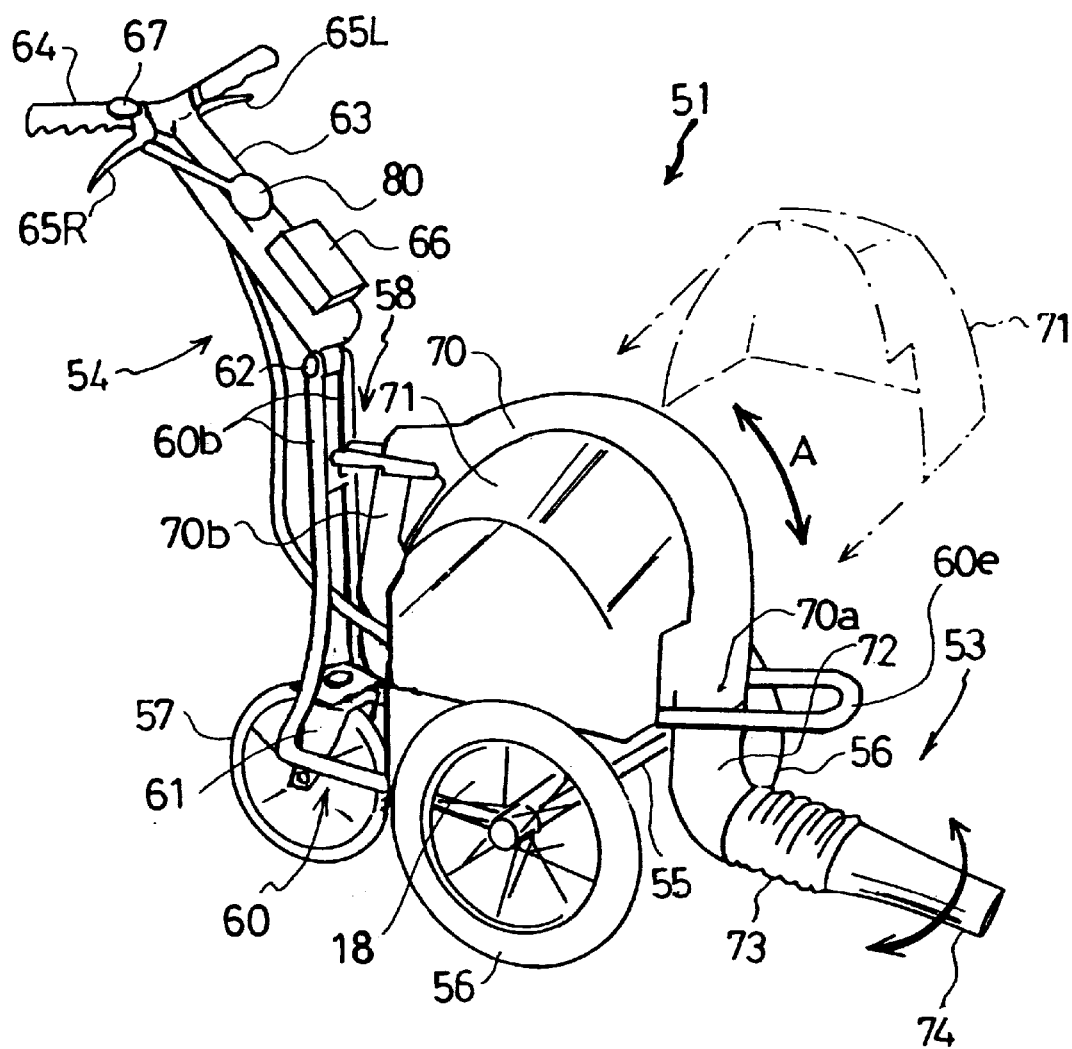
FIG. 14 is a perspective view of a movable blower according to the second embodiment of the invention.

The vertical swing linking mechanism 58 will now be described with reference to FIGS. 16 and 17 and the like. Although the blower 2 itself is turned so as to be lifted with respect to the base 12 as a part of the moving means 4 in the foregoing embodiment, in the present embodiment, the blower unit 52 in which the blower casing 70, the lateral swing linking mechanism 59, and the like are supported on the blower frame 90 is swingably supported on the moving means 54 (main frame 60) so as to be lifted as described above. In some midpoints in the vertical direction of the handle supports 60*b*, as illustrated in FIG. 14, the vertical swing linking mechanism 58 is disposed.

Figure 16:
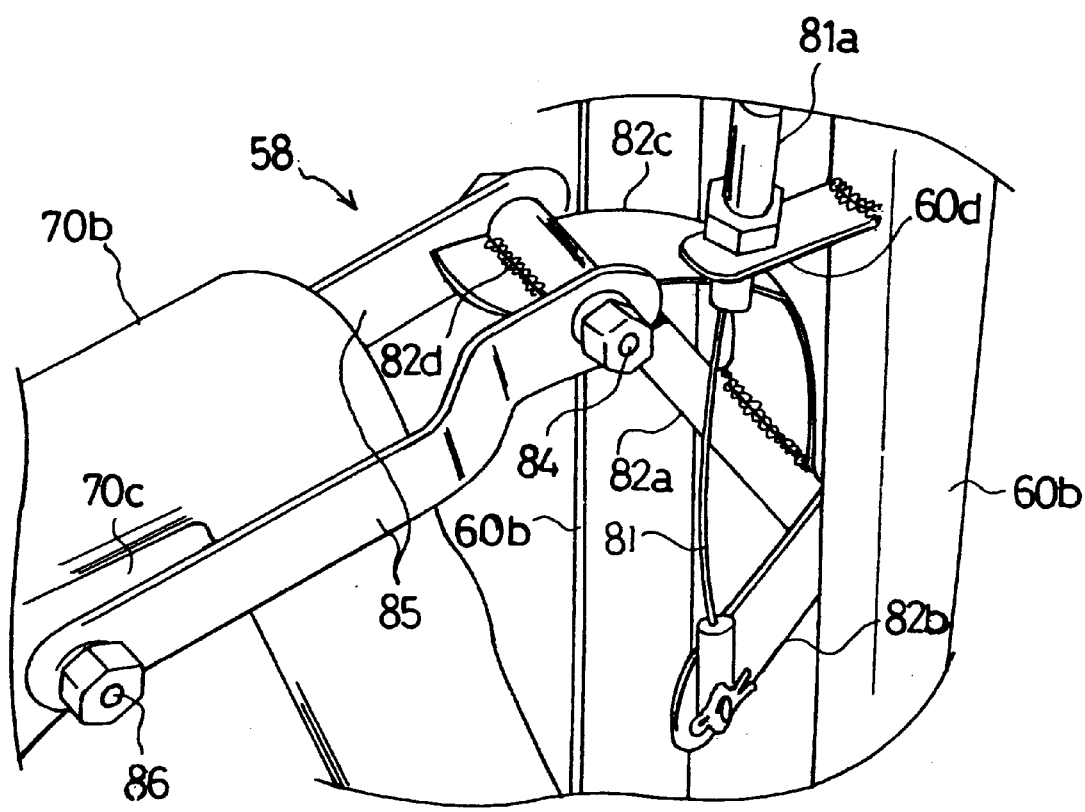
FIG. 16 is a partially enlarged perspective view of the movable blower showing a vertical swing linking mechanism of the movable blower.
Figure 17:
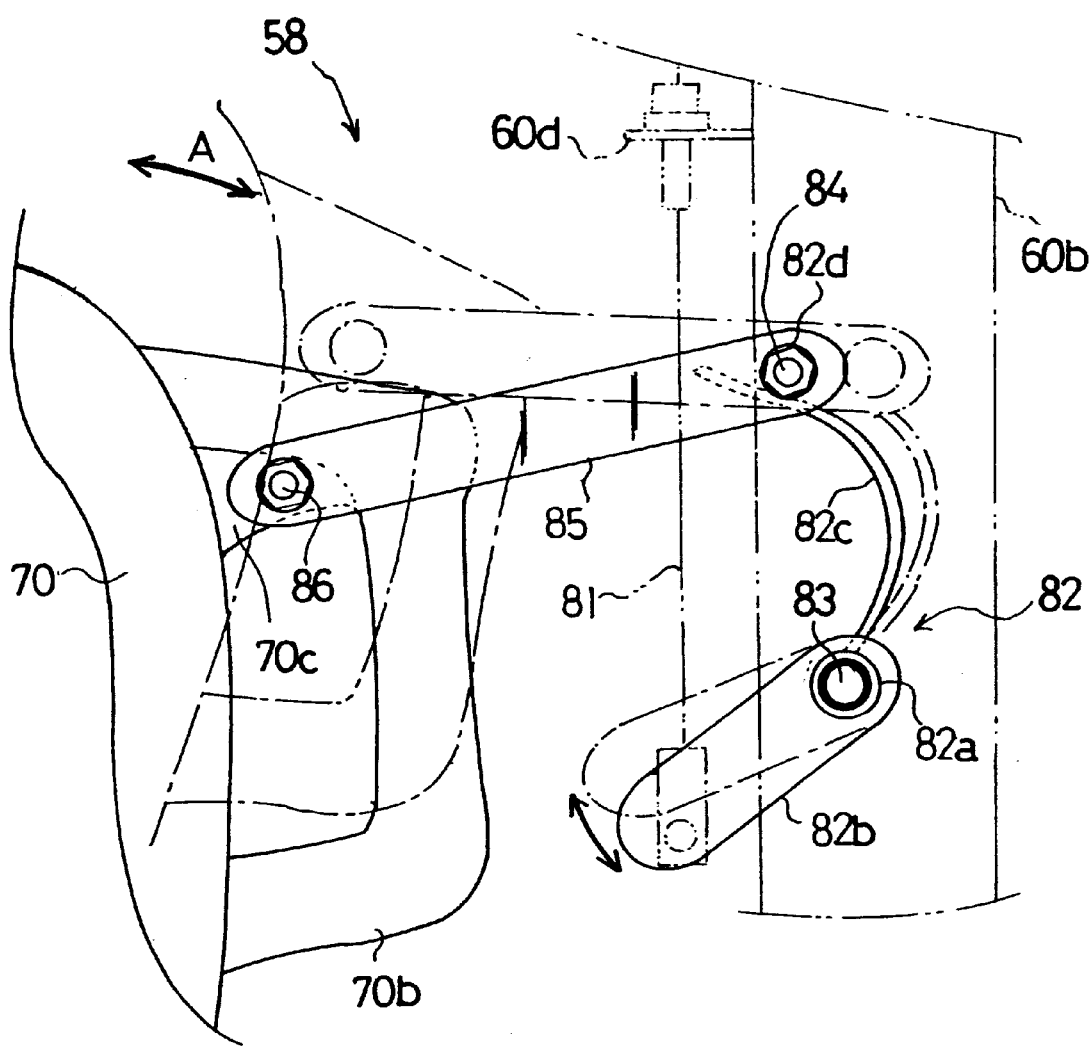
FIG. 17 is a partially enlarged side view of the same.

With respect to the vertical swing linking mechanism 58, as shown in FIGS. 16 and 17, the flat stay 60*d* is projected from the front end surface of one of the right and left handle supports 60*b* in the moving means 54. A swing fulcrum shaft 83 lays laterally across the supports 60*b* below the flat stay 60*d*. A boss 82*a* of a swing member 82 is loosely fit to the swing fulcrum shaft 83, and an arm 82*b* is fixedly extended to the front from the boss 82*a*. A curved coupling part 82*c* is fixedly extended from the upper end of the boss 82*a* to the upper front and a boss 82*d* is fixed in the lateral direction near the front end of the curved coupling part 82*c*. As mentioned above, the swing member 82 is pivotally supported so as to be lifted between the pair of supports 60*b*.

A vertical position adjusting lever 80 is laterally rotatably supported on the front ends of the supports 60*b* above the stay 60*d*, a wire 81 is extended from the lever 80 downward along the support 60*b*, the tip of a cable tube 81*a* wrapping the wire 81 is fixed to the stay 60*d*, and the wire 81 is further extended from the tip of the cable tube 81*a* to the downward and is pivotally connected at the front end of the arm 82*b* of the swing member 82.

Meanwhile, a handle-like part 70*b* is integrally formed in the rear part of the blower casing 70, a tab 70*c* is formed at the upper proximal part of the handle-like part 70*b*, and a pivot shaft 86 is laterally inserted into the tab 70*c*. The front ends of a pair of right and left coupling members 85 are pivotally supported on the right and left ends of the pivot shaft 86, and the rear ends of the coupling members 85 are arranged on the right and left ends of the boss 82*d* of the swing member 82 and pivotally supported by the pivot shaft 84.

In the construction of the vertical swing linking mechanism 58, at normal time, as shown by the solid line in FIG. 17, the coupling members 85 are pulled to the front by the blower unit 52 because of the self weight of the blower unit 52. The arm 82*b* is in the lower swing position in a state where the wire 81 is pulled to the arm part 82*b*. At this time, the blower unit 52 is inclined forward and the front end of the nozzle 81 is in contact with the ground.

When the wire 81 is pulled by the lever 80, as the phantom lines in FIG. 17, the front end of the arm 82*b* is turned upward, the whole swing member 82 is turned backward, the blower unit 52 is pulled backward together with the coupling member 85, and the discharge pipe 53 is moved upward and stopped in the position where it comes into contact with the discharge pipe stopper 60*e*. Also, it may be stopped in the position where the handle-like part 70*b* abuts against the curved coupling part 82*c*.

As mentioned above, the swing member 82 in the vertical swing linking mechanism 58 is swung only by the operation of the lever 80 disposed in the handle part of the moving means 54 in accordance with the conditions on each occasion and the coupling members 85 push and pull the blower unit 52 in the back and forth directions, thereby enabling a blast direction to be vertically adjusted. The vertical swing linking mechanism 58, that is, the swing member 82 and the coupling members 88 as an operation part are arranged in the upper rear part of the blower unit 52 and are apart from the pivot point of the hinge parts 90*a* of the blower frame 90 to the masts 60*f* of the main frame 60 as a vertical (back/forth) swing fulcrum of the blower unit 52.

Consequently, a small operation force is sufficient and an operation stress applied on the swing member 82 of the vertical swing linking mechanism 58 and the like is accordingly small, so that the durability is preferable.

Figure 18:
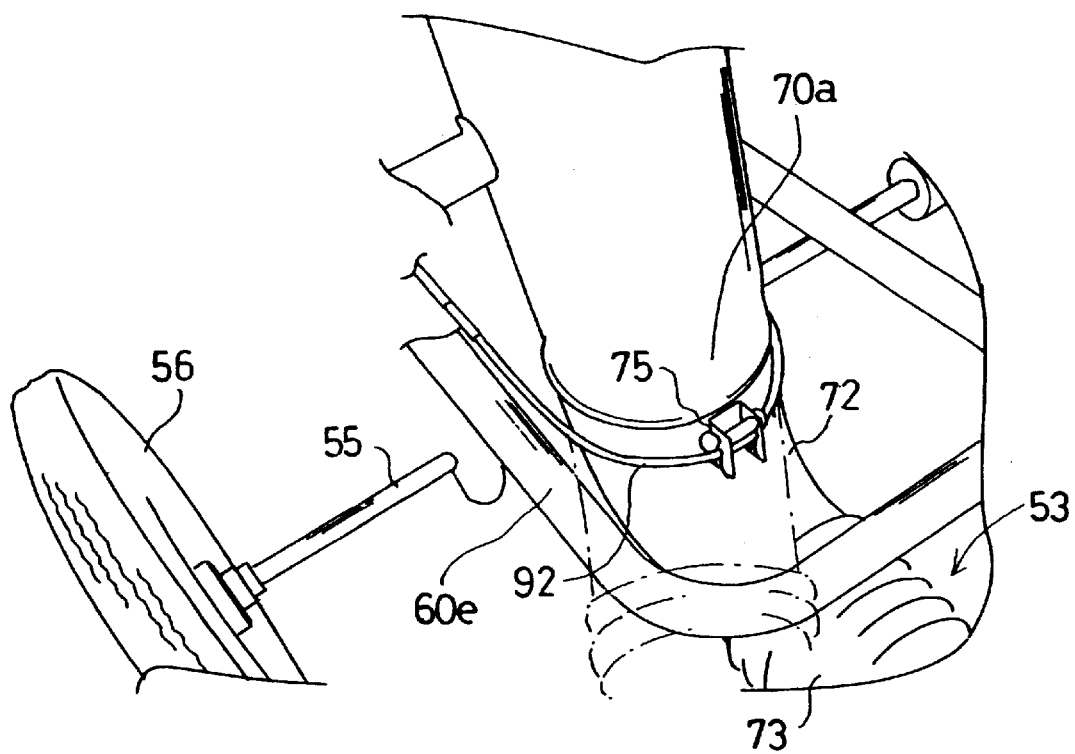
FIG. 18 is a partial perspective view of the movable blower showing a lateral swing supporting member of a discharge pipe.
Figure 19:
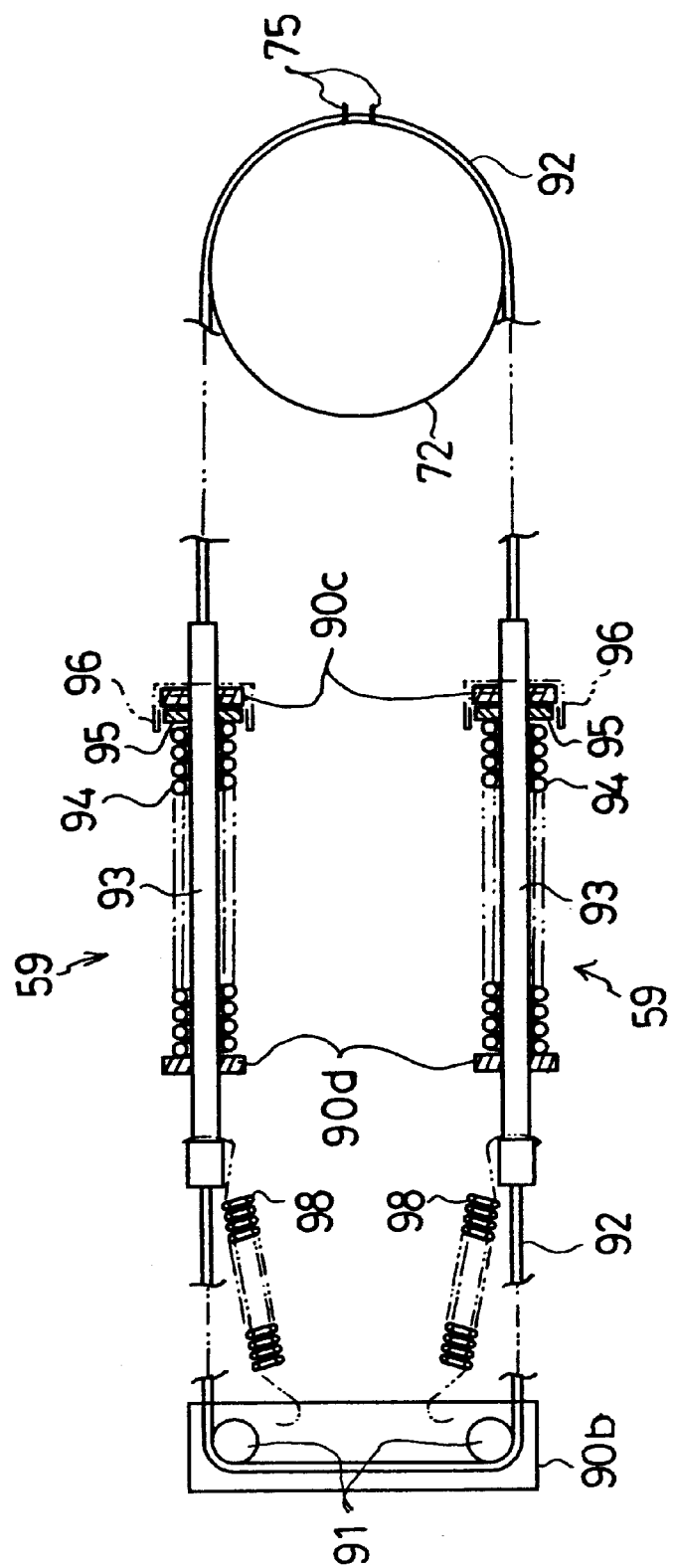
FIG. 19 is a schematic plan view of a lateral swing linking mechanism.
Figure 20:
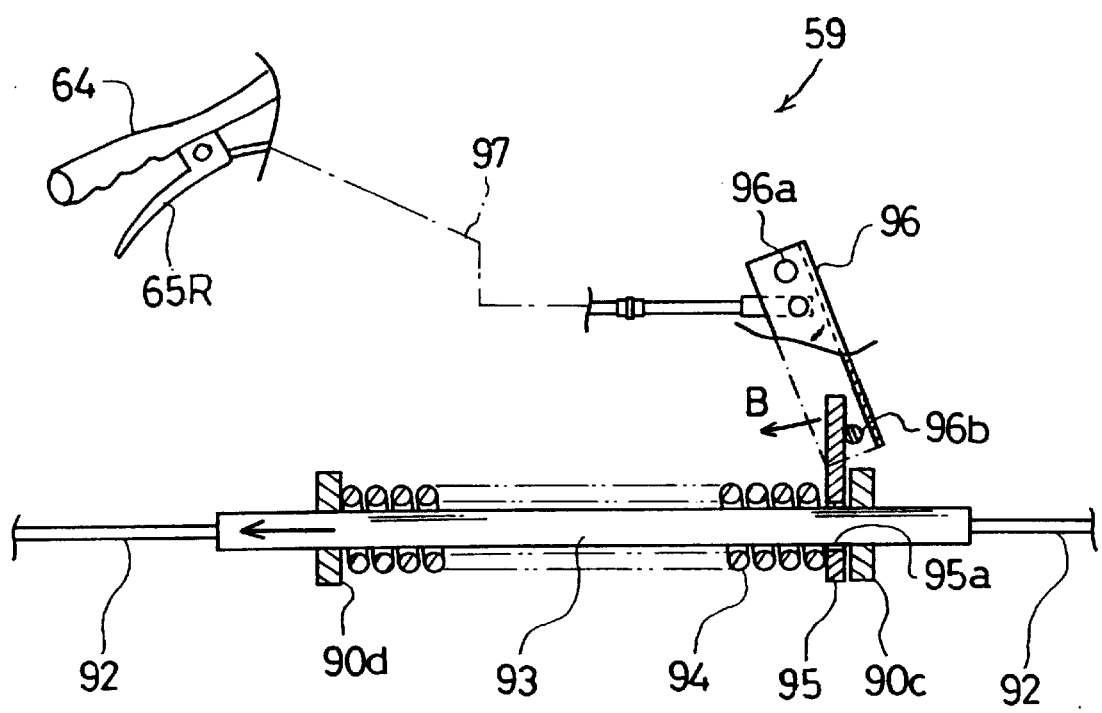
FIG. 20 is a schematic side cross section of the same.

The construction of the lateral swing linking mechanism 58 for turning the discharge pipe 53 in the lateral direction with respect to the blower unit 52 will be described with reference to FIGS. 18 to 21. As shown in FIG. 18, a wire fixing member 75 is fixed to the lateral center of the front end of the vertical portion of the bent pipe 72 attached to the lower end of the blast port 70*a* of the blower casing 70.

An endless first cable 92 is almost horizontally wound along the front-half of the outer periphery of the vertical portion of the bent pipe 72 and is retained and fixed by the cable fixing member 75. The first cable 92 is extended further backward and passes by the right and left sides of the lower part of the blower casing 70, and is extended to a position just before the handle supports 60*b* on the rear side of the blower casing 70.

On the rear side of the blower frame 90, a pulley supporting member 90*b* is extended to a point just before the handle support 60*b*. A pair of pulleys 91 are pivotally supported on the right and left sides of the pulley supporting member 90*b* and the rear end part of the first cable 92 is wound around the pulleys 91.

The first cable 92 is not limited to an endless type. Both ends of a single cable may be fixed to the front end of the bent pipe 72. It is also possible to extend right and left cables rearward from the front end of the bent pipe 72 and connect the rear ends. The constructions are substantially the same as that in which a part of the endless first cable 92 is fixed to the front end of the bent pipe 72.

On each of the right and left sides of the blower casing 70, a slidable tube 93 of a fixed length is fixed around the wire of the first cable 92. The first cable 92 may be also constructed such that the wire thereof is separated into a front wire wound around the bent pipe 72 and a rear wire wound around the pulleys 91, and a pair of rods replacing the slidable tubes 93 are interposed between the rear ends of the front wire and the front ends of the rear wire. Each slidable tube 93 slidably passes through a front guide plate 90*c* and a rear guide plate 90d, which are vertically provided left and right on the blower frame 90. Between the front and rear guide plates 90c and 90d, a first spring 94 is fit on the slidable tube 93 and a pressing member 95 is disposed between the front end of the first spring 94 and the front guide plate 90c. A hole 95a having the diameter slightly larger than the outside diameter of the tube 93 so as to have a play is opened in the pressing member 95 and the tube 93 passes through the hole 95a.

The upper part of a U-shaped swing member 96 whose rear parts are open in cross section is swingably supported on the blower frame 90 by the swing fulcrum shaft 96a and a pressing pin 96b is suspended and supported in the lower part of the swing member 96.

The pressing member 95 is extended upward, enters between the right and left side plates of the swing member 96, and comes into contact with the rear end of the pressing pin 96b.

Just below the swing fulcrum shaft 96a, one end of a second cable 97 is pivotally supported by the swing member 96 and the other end of the second cable 97 is coupled to each of the right and left nozzle operation levers 65L and 65R.

One ends of a pair of second springs 98 for returning the nozzle 74 which turned to the right or left to the center position are retained by the pulley supporting part 90b near each pulley 91. The other ends of the second springs 98 are extended to the front and retained by the rear end parts of the tubes 93. By pulling the tubes 93 rearward, it is urged so that the discharge pipe 53 is directed to the front.

Figure 21:
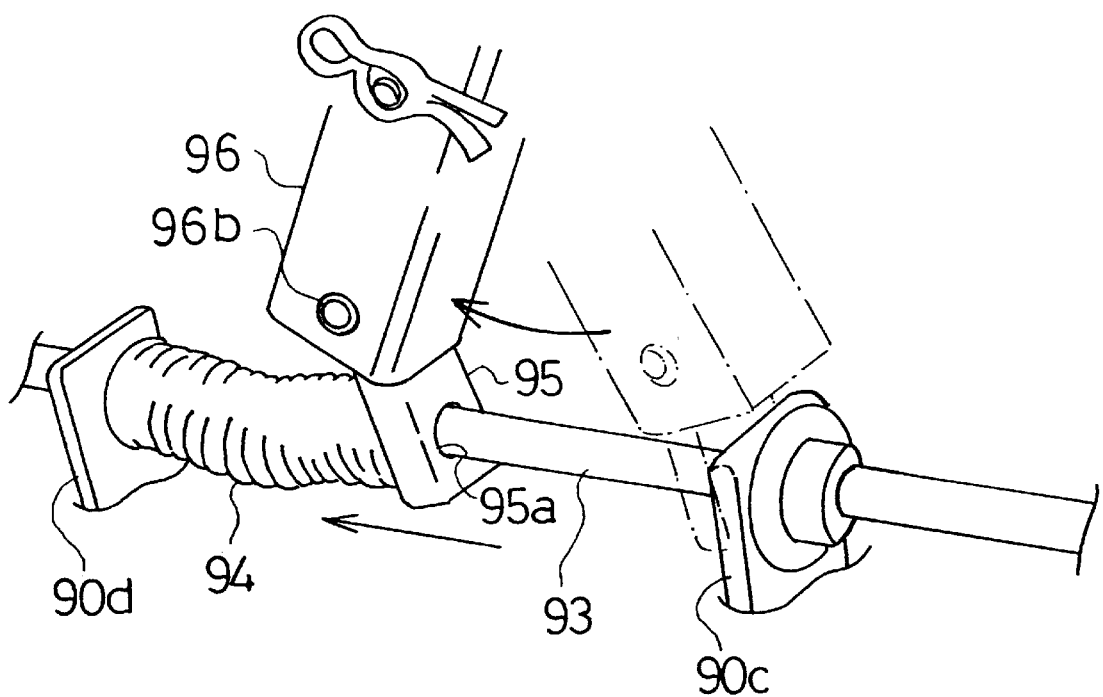
FIG. 21 is a partially enlarged perspective view of the same.

With the construction, when the worker grips, for example, the right one 65R of the nozzle operation levers 65L and 65R, the second cable 97 on the right side is pulled backward interlockingly and the lower end of the right swing member 96 is turned rearward around the swing fulcrum shaft 96a as a center. By the turn of the swing member 96, the pressing pin 96b pushes the pressing member 95 in the direction of the arrow B in FIG. 20. In this instance, although the hole 95a in the pressing member 95 is formed slightly larger than the outside diameter of the tube 93 as mentioned above, the lower part of the pressing member 95 is pushed by the urging force to the front of the first spring 94 and is inclined slightly rear upward, as shown in FIG. 21. The hole 95a is stopped on the tube 93, and the pressing member 95 and the tube 93 move rearward together.

The right tube 93 is pushed together with the first cable 92 by the right pressing member 95 and slides backward along the guides plates 90c and 90d. During this period, the first spring 94 is contracted between the right pressing member 95 and the guide plate 90d positioned on the rear side of the pressing member 95. When the right first spring 94 is finally most contracted, the movement of the pressing member 95 is stopped and the rearward sliding of the right side of the first cable 92 is also stopped. On the other hand, during the right side of the first cable 92 slides backward, the first cable 92 moves around the pulleys 91 and slides to the front on the left side of the blower casing 70. Although the left-side tube 93 also slides forward, the left-side pressing member 95 is pressed against the front guide plate 90c and in a vertical state. Since the tube 93 passes through the hole 95a having the diameter larger than that of the tube 93, the forward sliding of the left side of the first cable 92 is not disturbed.

When the right-side nozzle operation lever 65R is operated in such a manner, the cable fixing member 75 at the front end of the bent pipe 72 moves to the right by the clockwise movement in plan view of the first cable 92, the whole discharge pipe 53 turns to the right by using the blast port 70a as a swing fulcrum integrally with the cable fixing member 75, and the front end of the nozzle 74 is moved to the right side.

When the worker releases the nozzle operation lever 65R, the pressing force of the right-side swing member 96 to the right-side pressing member 95 is cancelled, and the pressing member 95 is returned to the original upright posture and is pushed to the front by a returning force of the first spring 94. During the period, the right-side tube 93 is in a free state with respect to the hole 95a in the pressing member 95. On the other hand, the pressing force of the right-side pressing member 95 is released, the left-side tube 93 which has been slid to the front is pulled rearward by the left-side second spring 98 and slides rearward to the original position. The right-side tube 93 passes through the hole 95a of the pressing member 95 and slides forward. The first cable 92 is therefore returned to the original state, the cable fixing member 75 is returned to the center position with respect to the right and left sides and the discharge pipe 53 is promptly and certainly returned to the original state in which the discharge pipe 53 is directed forward.

When the left-side nozzle operation lever 64L is operated, the opposite operation is performed. By rearward movement of the left-side pressing member 95, the first cable 92 is moved counterclockwise in plan view, the discharge pipe 53 is turned to the left side, and the front end of the nozzle 74 is moved to the left side. When the operation of the nozzle operation lever 64L is cancelled, the first cable 92 is pulled clockwise in plan view by the returning force of the right-side second spring 98 and the discharge pipe 53 is returned to the original position.

In the case of the movable blower 1 of the first embodiment, since the single wires 28a and 28b are directly connected from the discharge pipe 3 to the right and left nozzle operation levers 27a and 27b, respectively, the wires 28a and 28b are long. In the case of the movable blower 51 of the present embodiment, however, the second cables 97 from the levers 64L and 64R are extended to the swing members 96 which are arranged on the right and left sides of the blower casing 70 and are consequently shorter than the wires 28a and 28b. The first cable 92 itself moves almost horizontally in association with the swing direction of the discharge pipe 53, so that the operation response is high.

Although the first and second embodiments of the movable blower of the invention have been described above, besides the above, for example, means which is transferred or slides on a rail or the like can be used as moving means. Further, the moving means can be of a self-driving type and remote controlled.

Although the battery as a power source is mounted on the moving means, it is also possible to extend a cord from the motor and connect the cord to a separately disposed battery or consent. The driving motor may be changed from the electric motor to a gasoline engine and either mounted on the moving means or connected to the blower itself.

Further, with respect to the discharge pipe, each of the discharge pipes disclosed in the first and second embodiments may be replaced by a long discharge pipe constructed by a long hose and a nozzle. The discharge pipe may be turned only in one of the right and left directions. In this case, in the first embodiment, one of the wires 28a and 28b and one of the nozzle operation levers 27a and 27b may be selectively provided. In the case of the second embodiment, for example, when only the right side is set to be swingable, it is sufficient to detach the left-side lever 65L, the second cable 97, and from the right and left swing linking mechanisms 58, the left-side swing member 96, pressing member 95, first spring 94 and tube 93, and further, the right-side second spring 98.

What is claimed is:

1. A movable blower, comprising:
    a movable support permitting movement thereof along a surface on which said movable support rests;
    a blower swingably supported on said movable support such that a relative inclination of said blower may be varied upwardly and downwardly;
    a discharge pipe attached to said blower; and
    a motor drivably connected to said blower.

2. A movable blower according to claim 1, wherein said movable support includes a wheel.

3. A movable blower according to claim 2, wherein said movable support further includes a caster wheel.

4. A movable blower according to claim 1, wherein said movable support includes a handle, said handle being supported in a manner permitting vertical adjustment thereof.

5. A movable blower according to claim 1, wherein said motor is an electric motor.

6. A movable blower according to claim 5, further comprising a power source mounted on said movable support.

7. A movable blower according to claim 1, wherein said discharge pipe is swingably supported on said blower.

8. A movable blower according to claim 7, further comprising:
    a handle carried on said movable support;
    a lever mounted to said handle; and
    a cable interposed between said lever and said discharge pipe, wherein, when said lever is operated, said cable is moved to swing said discharge pipe in either of a right and left direction with respect to said blower.

9. A movable blower, comprising:
    a movable support permitting movement thereof along a support surface on which said movable support rests;
    a blower swingably supported on said movable support such that a relative inclination of said blower may be varied upwardly and downwardly;
    a discharge pipe attached to said blower;
    a motor drivably connected to said blower;
    a swing fulcrum of said blower for said movable support being positioned lower than the blower; and
    a linking mechanism, for swinging the blower to adjust the inclination of the blower disposed higher than said swing fulcrum.

10. A movable blower according to claim 9, further comprising:
    a handle carried on said movable support;
    a lever mounted to said handle; and
    a cable interposed between said lever and said linking mechanism, wherein, when said lever is operated, said cable is moved to swing said blower so as to adjust the inclination of said blower upward or downward with respect to said movable support.

11. A movable blower, comprising:
    a movable support permitting movement thereof along a surface on which said movable support rests;
    a blower swingably supported on said movable support such that a relative inclination of said blower may be varied upwardly and downwardly;
    a discharge pipe swingably supported on said blower;
    a motor drivably connected to said blower;
    a handle carried on said movable support;
    a pair of levers mounted to said handle; and
    a pair of cables interposed between said levers and said discharge pipe, wherein, when said levers are operated, said cables are moved to swing said discharge pipe in one of a right and a left direction, respectively, with respect to said blower.

12. A movable blower, comprising:
    a movable support permitting movement thereof along a surface on which said movable support rests;
    a blower swingably supported on said movable support such that a relative inclination of said blower may be varied upwardly and downwardly;
    a discharge pipe swingably supported on said blower;
    a motor drivably connected to said blower;
    a first cable extended from said discharge pipe;
    an actuating member provided to move said first cable in one direction; a handle provided for said movable support;
    a lever provided for said handle; and
    a second cable interposed between said lever and said actuating member, wherein, when said lever is operated, said actuation member is retained by said first cable, said first cable is moved in one direction, and said discharge pipe is swung to either of a right and left side with respect to said blower.

13. A movable blower according to claim 12, wherein said first cable is of an endless type and wound around said discharge pipe, and a part of said first cable is fixed to said discharge pipe.

14. A movable blower according to claim 13, wherein a pair of said actuation members, a pair of said levers, and a pair of said second cables are provided.

15. A movable blower according to claim 12, further comprising:
    an urging member connected to said first cable, wherein, when an operation force to said lever is cancelled, retaining of said actuation member to said first cable is cancelled, and said urging member urges said first cable to return said discharge pipe to the initial position.

16. A movable blower according to claim 15, wherein said first cable is of an endless type and wound around said discharge pipe, and a part of said first cable is fixed to said discharge pipe.

17. A movable blower according to claim 16, wherein a pair of said actuation members, a pair of said levers, a pair of said second cables, and a pair of said urging members are provided.

* * * * *